United States Patent
Ikefuji et al.

(10) Patent No.: US 10,424,977 B2
(45) Date of Patent: Sep. 24, 2019

(54) CHARGING SYSTEM USING NFC, MOBILE DEVICE CHARGEABLE BY NFC, AND CHARGER

(71) Applicant: Rohm Co., Ltd., Kyoto (JP)

(72) Inventors: Yoshihiro Ikefuji, Kyoto (JP); Masahide Tanaka, Osaka (JP)

(73) Assignee: Rohm Co., Ltd., Kyoto (JP)

(*) Notice: Subject to any disclaimer, the term of this patent is extended or adjusted under 35 U.S.C. 154(b) by 0 days.

(21) Appl. No.: 15/571,136

(22) PCT Filed: May 20, 2016

(86) PCT No.: PCT/JP2016/064953
§ 371 (c)(1),
(2) Date: Nov. 1, 2017

(87) PCT Pub. No.: WO2016/194643
PCT Pub. Date: Dec. 8, 2016

(65) Prior Publication Data
US 2018/0175676 A1    Jun. 21, 2018

(30) Foreign Application Priority Data

Jun. 3, 2015 (JP) .................................. 2015-112847
Mar. 17, 2016 (JP) .................................. 2016-053386

(51) Int. Cl.
*H02J 7/02* (2016.01)
*H02J 50/90* (2016.01)
(Continued)

(52) U.S. Cl.
CPC ............ *H02J 50/90* (2016.02); *H02J 7/0027* (2013.01); *H02J 7/0044* (2013.01);
(Continued)

(58) Field of Classification Search
USPC ........................................................ 320/108
See application file for complete search history.

(56) References Cited

U.S. PATENT DOCUMENTS

2003/0092467 A1   5/2003   Masuda et al.
2006/0194613 A1   8/2006   Masuda et al.
(Continued)

FOREIGN PATENT DOCUMENTS

JP    H05-234763    9/1993
JP    10-023676    1/1998
(Continued)

OTHER PUBLICATIONS

Japan Patent Office, International Search Report for international patent application PCT/JP2016/064953, dated Jul. 19, 2016 (with English translation).

(Continued)

*Primary Examiner* — Mohammed Alam
(74) *Attorney, Agent, or Firm* — Fish & Richardson P.C.

(57) ABSTRACT

Provided is a charging system characterized by being provided with: a mobile device including a first NFC antenna and a rechargeable battery which is charged on the basis of a current induced in the first NFC antenna by electromagnetic induction; and a charger including a second NFC antenna which causes electromagnetic induction to be induced in the first NFC antenna, and a supply unit which supplies the second NFC antenna with a feed current for inducing the electromagnetic induction; and in that the charging system is further provided with a control means for causing an intended electromagnetic induction to arise between the first NFC antenna and the second NFC antenna.

20 Claims, 20 Drawing Sheets

(51) Int. Cl.
*H02J 50/10* (2016.01)
*H02J 50/80* (2016.01)
*H02J 7/00* (2006.01)
*H04B 5/00* (2006.01)
*H04W 52/02* (2009.01)
*H02J 50/12* (2016.01)

(52) U.S. Cl.
CPC .......... *H02J 7/0047* (2013.01); *H02J 7/0052* (2013.01); *H02J 7/025* (2013.01); *H02J 50/10* (2016.02); *H02J 50/12* (2016.02); *H02J 50/80* (2016.02); *H04B 5/0093* (2013.01); *H04W 52/027* (2013.01); *H02J 2007/0001* (2013.01); *H02J 2007/006* (2013.01); *H02J 2007/0062* (2013.01); *H02J 2007/0096* (2013.01)

(56) References Cited

U.S. PATENT DOCUMENTS

| | | | |
|---|---|---|---|
| 2011/0309792 A1 | 12/2011 | Mochida et al. | |
| 2013/0119929 A1* | 5/2013 | Partovi | H02J 7/025 320/108 |
| 2013/0157565 A1* | 6/2013 | Clement | H04B 5/0037 455/41.1 |
| 2013/0234658 A1 | 9/2013 | Endo et al. | |
| 2014/0266939 A1* | 9/2014 | Baringer | H01Q 21/28 343/729 |
| 2015/0229158 A1 | 8/2015 | Endo et al. | |
| 2017/0181087 A1* | 6/2017 | Kato | H02J 7/025 |
| 2018/0175676 A1* | 6/2018 | Ikefuji | H02J 7/00 |

FOREIGN PATENT DOCUMENTS

| | | |
|---|---|---|
| JP | 2003-152889 | 5/2003 |
| JP | 2004-164566 | 6/2004 |
| JP | 2006-295312 | 10/2006 |
| JP | 2010-207017 | 9/2010 |
| JP | 2010-273473 | 12/2010 |
| JP | 2011-172154 | 9/2011 |
| JP | 2013-191913 | 9/2013 |
| JP | 2013-215036 | 10/2013 |
| JP | 2014-225989 | 12/2014 |
| JP | 2015-027241 | 2/2015 |
| JP | 2015-076762 | 4/2015 |

OTHER PUBLICATIONS

Japanese Patent Office; Office Action mailed in corresponding Japanese Patent Application No. 2015-112847 (dated Jan. 15, 2019).

* cited by examiner

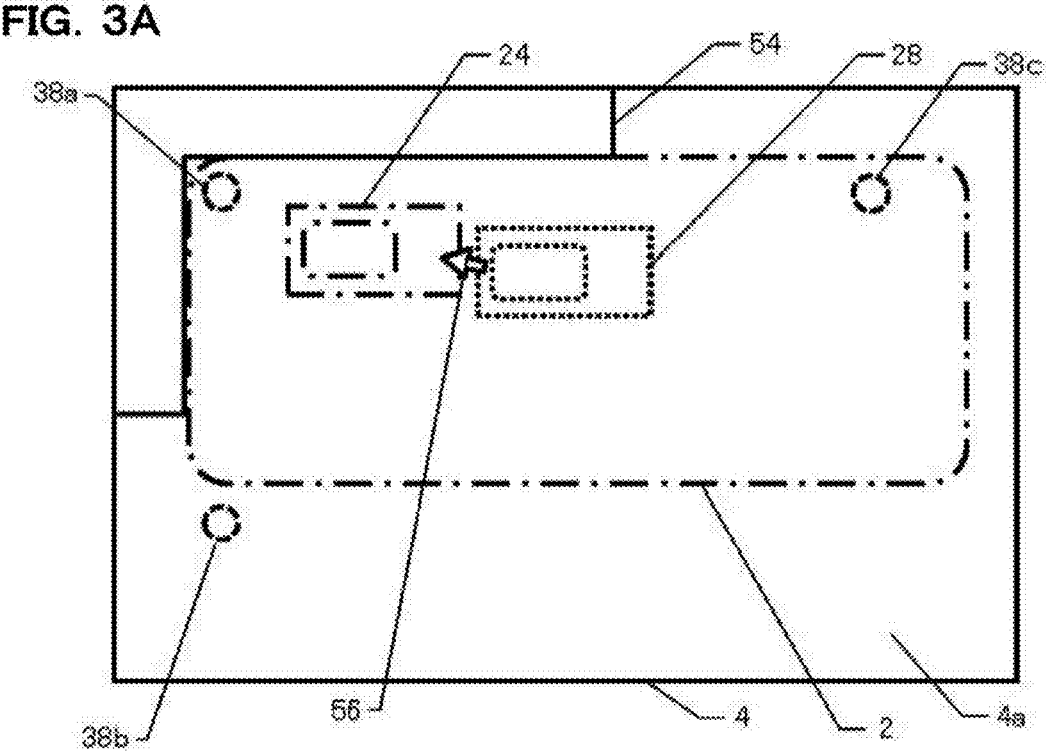
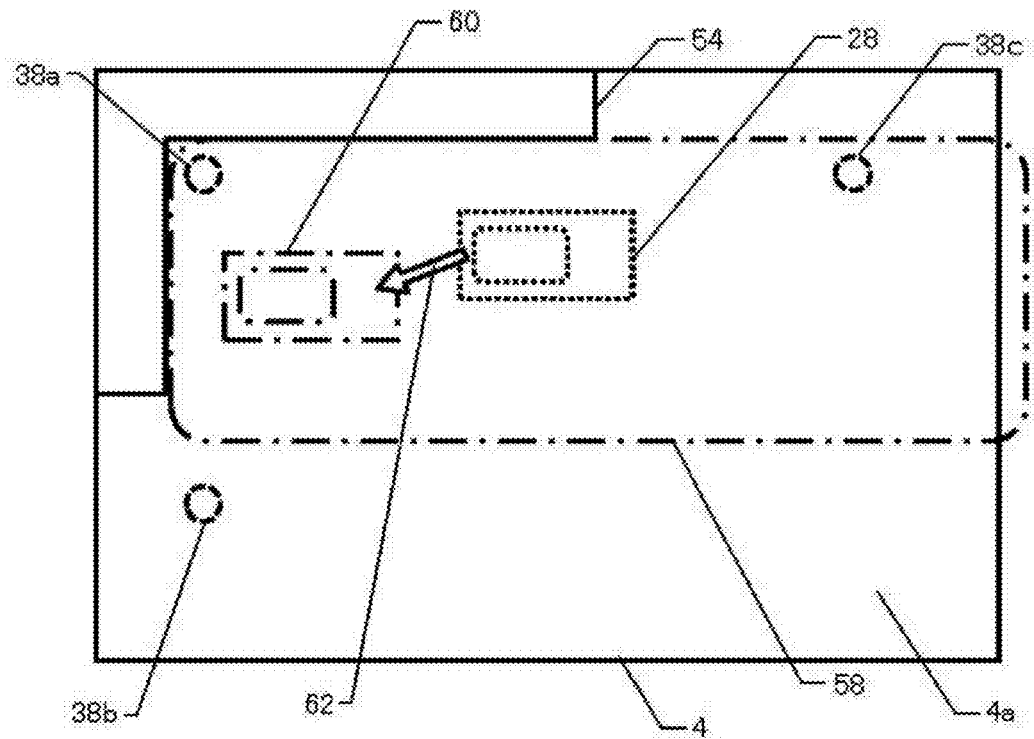

CHARGING SYSTEM USING NFC, MOBILE DEVICE CHARGEABLE BY NFC, AND CHARGER

TECHNICAL FIELD

The present invention relates to charging systems using NFC, mobile devices chargeable by NFC, and chargers.

BACKGROUND ART

NFC (near-field communication) is an international standard of technology for low-power wireless communication ranging over distances of about 10 centimeters, and is adopted in small-size mobile terminal devices, such as smartphones, and in digital cameras. NFC is applied for various purposes. For example, Patent Document 1 identified below teaches bringing a digital camera and a mobile telephone in proximity to each other to establish, first, connection by NFC to exchange wireless parameters, and then establishing connection via a wireless LAN or Bluetooth (registered trademark) to proceed to transfer of images. On the other hand, for example, Patent Document 2 identified below teaches wireless charging performed by sharing an antenna for NFC.

LIST OF CITATIONS

Patent Literature

Patent Document 1: Japanese Patent Application published as No. 2015-076762
Patent Document 2: Japanese Patent Application published as No. 2013-191913

SUMMARY OF THE INVENTION

Technical Problem

Inconveniently, conventional charging systems using NFC, mobile devices chargeable by NFC, and chargers leave many problems to be solved.

Against the background mentioned above, the present invention aims to provide more useful charging systems using NFC, mobile devices chargeable by NFC, and chargers.

Means for Solving the Problem

According to one aspect of the present invention, a charging system includes: a mobile device including a first NFC antenna and a rechargeable battery which is charged based on a current induced in the first NFC antenna by electromagnetic induction; a charger including a second NFC antenna which causes electromagnetic induction in the first NFC antenna and a supplier which supplies the second NFC antenna with a feed current for electromagnetic induction; and a controller which causes desired electromagnetic induction between the first and second NFC antennas. Thus, it is possible to perform proper charging using NFC.

According to a specific feature of the present invention, the controller is a protector which inhibits the supplier from supplying the feed current unless the mobile device in a predetermined state is confirmed to be in proximity to the charger. According to another specific feature, the controller is a guide which guides such that the mobile device in a predetermined state is in proximity to the charger. According to a more specific feature, the guide prevents a device not expected to be charged from being in proximity to the second NFC antenna. Or the guide includes a guide display part which guides as to a direction in which the mobile device in the predetermined state is in proximity to the charger. According to yet another specific feature, the charging system further includes: an actuator which moves the second NFC antenna to a position corresponding to the first NFC antenna, and the controller is a protector which inhibits the second NFC antenna from moving when improper electromagnetic induction is recognized to be about to occur.

According to another aspect of the present invention, a charger includes: a power feeding-compatible NFC antenna which causes electromagnetic induction in an NFC antenna in a mobile device; a charger including a supplier which supplies a feed current for electromagnetic induction to the power feeding-compatible NFC antenna; and a protector which prevents improper electromagnetic induction by the power feeding-compatible NFC antenna.

According to yet another aspect of the present invention, a mobile device includes: a communication NFC antenna; a rechargeable battery which shares the communication NFC antenna to be charged based on a current induced in the communication NFC antenna by electromagnetic induction; and a guide which guides the communication NFC antenna to the charger for electromagnetic induction. According to a specific feature, the guide is an accessory dedicated to but separate from the mobile device, and guides, when combined with the mobile device, the communication NFC antenna to the charger. According to another specific feature, the guide is a guide display part.

According to a more specific feature, the guide display part displays a movement direction in which to move the mobile device across the top face of the charger. According to another more specific feature, the mobile device uses a display which displays a mobile device function to perform the guidance display in a power-saving manner. Specifically, when the guidance display is performed, it is done in a power-saving manner by using only a partial region of the display surface of the display. Or, if the display has a color display function, the guidance display is performed in a power-saving manner using the display in monochrome. Or, if the display has a backlight, the guidance display is performed using the backlight in a power-saving manner. Or the guidance display is performed in a power-saving manner by, when it is done, reducing the reference clock frequency of the mobile device. These different modes of power-saving guidance display may be implemented in any combination.

According to another specific feature, in the mobile device, an insufficient charge is judged with sufficient electric power left for guiding by the guide display part, and in an insufficiently charged state, any operation other than guiding by the guide display part is inhibited. According to another specific feature, the guide display part guides a user as to a direction for positioning based on a change in the strength of an electromagnetic field resulting from the user moving the mobile device. According to another specific feature, in a suspension state due to an insufficient charge, the guide display part can be operated. According to a more specific feature, whether or not to operate the guide display part is monitored intermittently to operate the guide display part. Or the guide display part is operated automatically at predetermined time intervals. According to yet another specific feature, when the mobile device is in a horizontal state, the guide display part is operated. According to another specific feature, when an electromagnetic field is recognized to be present, the guide display part is operated. According to another specific feature, the guide display part displays whether or not the communication NFC antenna is positioned properly relative to the charger.

Advantageous Effects of the Invention

As mentioned above, according to the present invention, it is possible to provide more useful charging systems using NFC, mobile devices chargeable by NFC, and chargers.

BRIEF DESCRIPTION OF DRAWINGS

FIG. 3A is a top view (first state) of a different model of digital camera placed on the charge/data transfer station in Example 1;

FIG. 3B is a top view (second state) of a different model of digital camera placed on the charge/data transfer station in Example 1;

DESCRIPTION OF EMBODIMENTS

Example 1

Figure 1:
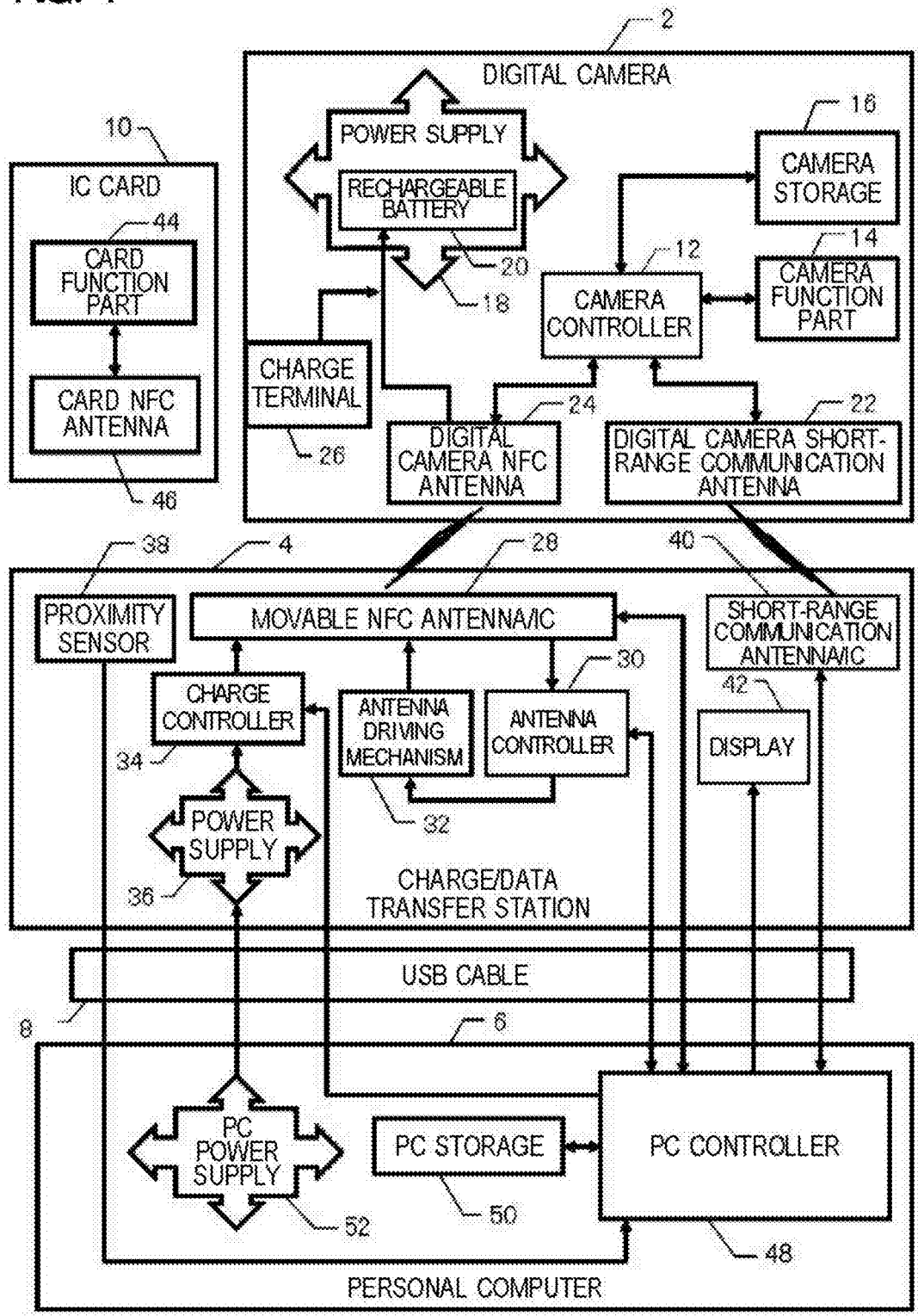
FIG. 1 is a block diagram showing the overall configuration of Example 1 embodying the present invention (Example 1)

FIG. 1 is a block diagram showing the overall configuration of a charging system of Example 1 embodying the present invention. The charging system in FIG. 1 includes a digital camera 2, a charge/data transfer station 4, and a personal computer 6. From the charge/data transfer station 4, which is connected to the personal computer 6 by a USB cable 8, the digital camera 2 as a charging target is charged by NFC. FIG. 1 also shows an IC card 10 which can communicate with the charge/data transfer station 4 by NFC. Its relationship with the charging system will be described later.

The digital camera 2 as a charging target includes a camera function part 14 and a camera storage 16. The camera function part 14 has, integrated into it, an optical system, an imager, an image processor, a display, an operation panel, and the like that realize the camera functions of the digital camera 2. The camera storage 16 stores programs, data, and the like necessary for a cameral controller 12 to function, and also stores image data obtained by the camera function part 14. A power supply 18 includes a battery of a rechargeable type (hereinafter the rechargeable battery 20), and supplies electric power to relevant blocks in the digital camera 2.

The digital camera 2 has a digital camera short-range communication antenna 22, and communicates with the charge/data transfer station 4 under the control of the cameral controller 12. The digital camera short-range communication antenna 22 can communicate directly with another device (for example, the personal computer 6) without the intervention of the charge/data transfer station 4. In the present description, the term "short-range communication" refers to communication over short distances of about several tens of meters by a wireless LAN or Bluetooth (registered trademark). In the communication range of such short-range communication, there can be present a plurality of communicable devices.

The digital camera 2 also has, arranged at its bottom face, a digital camera NFC antenna 24, and communicates with the charge/data transfer station 4 under the control of the cameral controller 12. The digital camera NFC antenna 24 is a flat antenna coil. The digital camera NFC antenna 24 has a communication range of about 10 centimeters, and thus, in this communication range, a single device is present that is placed in proximity to the digital camera 2. The digital camera NFC antenna 24 is thus inherently a communication antenna; for example, it has the functions, among others, of first, when a single device enters the communication range of the digital camera NFC antenna 24, establishing communication with that particular device and thereafter allowing exchange of a large amount of image data with the particular device via the digital camera short-range communication antenna 22.

In Example 1, the digital camera NFC antenna 24 described above is shared for contactless charging. Specifically, it permits the rechargeable battery 20 to be charged with the current induced in the digital camera NFC antenna 24 by the change of the electromagnetic field caused by a power-supply external device placed in proximity. The rechargeable battery 20 can be charged from outside also via a contact provided as an ordinary charge terminal 26.

The charge/data transfer station 4 has a charging surface with which the face of the digital camera 2 at which the digital camera NFC antenna 24 is arranged makes contact. Under the charging surface, a movable NFC antenna/IC 28 can move. Thus, with different models of digital cameras having the digital camera NFC antenna 24 arranged at different positions, the movable NFC antenna/IC 28 can be moved to the position corresponding to the digital camera NFC antenna 24 so that efficient charging can be performed. The NFC antenna in the movable NFC antenna/IC 28 also is a flat antenna coil, and when it is moved to the position corresponding to the digital camera NFC antenna 24, the two flat antenna coils lie parallel to and in proximity to each other and achieve satisfactory electromagnetic induction. For the purpose of such positioning, an antenna controller 30 monitors the current in the movable NFC antenna/IC 28, and based on it controls an antenna driving mechanism 32. As will be described later, the antenna driving mechanism 32 can move the movable NFC antenna/IC 28 in two-dimensional, X-Y, directions.

Using electric power from a power supply 36 based on the supply of electric power from the personal computer 6, a charge controller 34 supplies the movable NFC antenna/IC 28 with a feed current for electromagnetic induction. The charge controller 34 inhibits the supply of the feed current when the digital camera 2 is judged not to be placed at a regular charging position or when what is placed at the regular charging position is judged to be an IC card 10 that is likely to be broken by electromagnetic induction. For this purpose, a proximity sensor 38 checks whether or not a device placed on the charging surface of the charge/data transfer station 4 is placed at the regular charging position and whether or not, even if it is placed at the regular charging position, it is the IC card 10. The details will be described later.

When, as described above, the digital camera 2 is judged not to be placed at the regular charging position or what is placed there is judged to be the IC card 10, the movable NFC antenna/IC 28 conducts routine communication with the device. Even if the movable NFC antenna/IC 28 is not located at the position corresponding to the digital camera NFC antenna 24, communication is possible; thus, when the supply of the feed current is inhibited, the movable NFC antenna/IC 28 is not moved.

A short-range communication antenna/IC 40 in the charge/data transfer station 4 exchanges a large amount of image data with the digital camera short-range communication antenna 22. A display 42 in the charge/data transfer station 4 indicates the progress, start, and completion of charging, the progress, start, and completion of data transfer, and the like.

The IC card 10 includes a card function part 44 for authentication and data communication with the personal computer 6 and a card NFC antenna 46 for exchange of data with the movable NFC antenna/IC 28 or with another data reader/writer.

The personal computer 6 includes a PC controller 48 for the control of the functions of the charge/data transfer station 4 as described above. A PC storage 50 stores programs, data, and the like necessary for the PC controller 48 to function, and also stores image data and the like transferred from the digital camera 2. A PC power supply 52 supplies the power supply 36 in the charge/data transfer station 4 with electric power. The USB cable 8 connects between the charge/data transfer station 4 and the personal computer 6 for the exchange of control information for the control of the functions of the charge/data transfer station 4 by the PC controller 48 and for the supply of electric power to the power supply 36 in the charge/data transfer station 4. It should be noted that the connection lines illustrated in FIG. 1 schematically show the interconnection among different blocks and do not show the actual structure of the USB cable 8. The actual transfer of control signals and electric power between the charge/data transfer station 4 and the personal computer 6 is conducted by a cable structure conforming to the standard for ordinary USB cables.

Figure 2A:
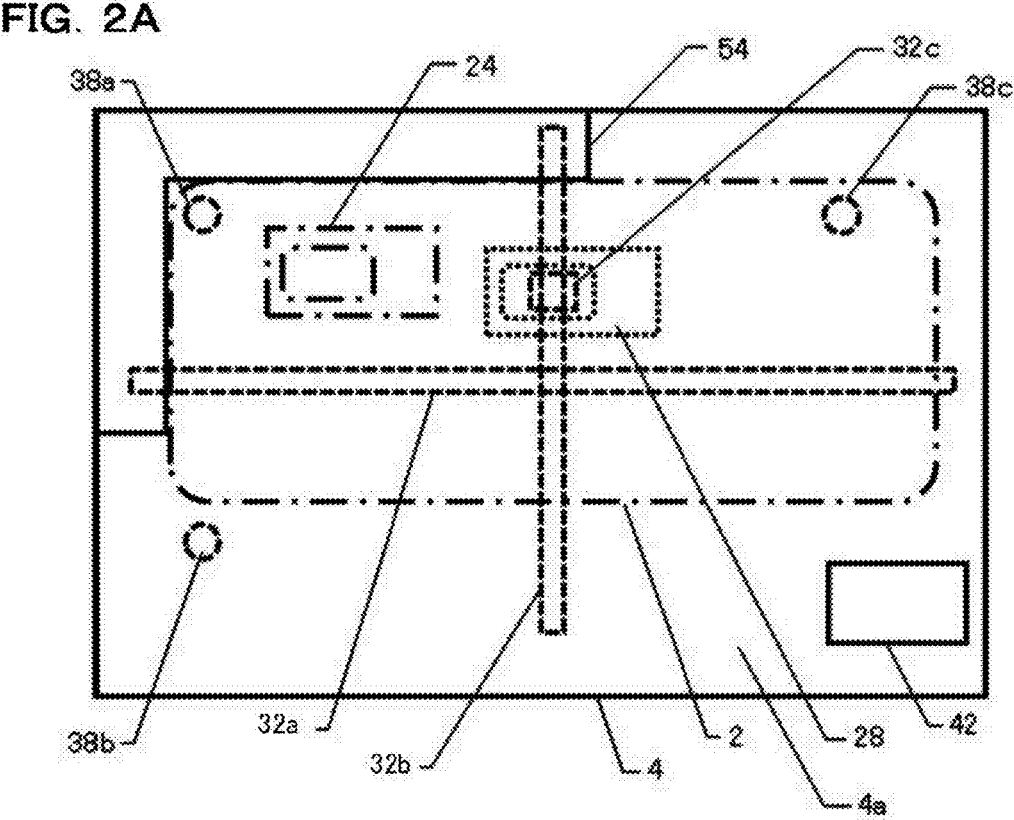
FIG. 2A is a top view of a charge/data transfer station in Example 1.
Figure 2B:
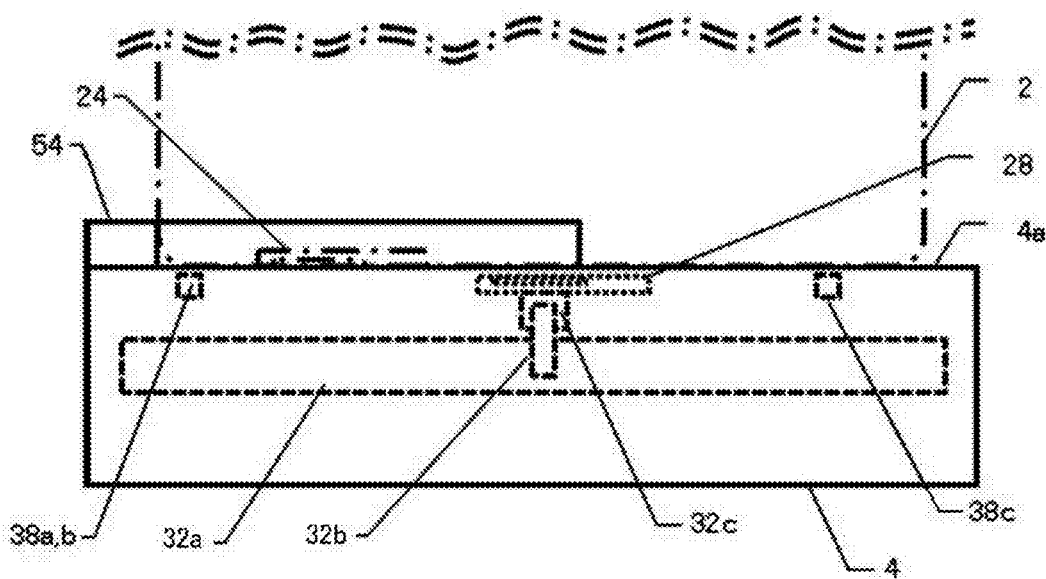
FIG. 2B is a front view of the charge/data transfer station in Example 1.

FIGS. 2A and 2B are a top view and a front view, respectively, of the charge/data transfer station 4 in Example 1 in FIG. 1. Such parts as appear also in FIG. 1 are identified by common reference numerals. FIG. 2A is a top view, and shows a state where the digital camera 2 (dash-dot line) is placed on the charging surface 4a of the charge/data transfer station 4. For the digital camera 2, the shape of its bottom face is indicated. On the charging surface 4a, an L-shaped positioning stopper 54 delimiting the regular charging position is provided. In the state in FIG. 2A, the digital camera 2 is placed on the charge/data transfer station 4 at the regular charging position where the digital camera 2 is pressed against the positioning stopper 54. As shown in FIG. 2A, the proximity sensor 38 comprises a regular position detection sensor 38a, a card detection sensor 38b, and a wrong-direction detection sensor 38c, which are each an optical proximity sensor.

When the digital camera 2 is placed in the regular charging position where it is pressed against the positioning stopper 54, the bottom face of the digital camera 2 covers the regular position detection sensor 38a and the wrong-direction detection sensor 38c. Thus, based on their outputs, it is possible to recognize that the digital camera 2 is set at the regular charging position. On the other hand, the card detection sensor 38b is located at a position where it is not covered by the bottom face of the digital camera 2. Thus, what is set is confirmed to be the digital camera 2. In this way, based on the combination of the outputs from the regular position detection sensor 38a, the card detection sensor 38b, and the wrong-direction detection sensor 38c, the digital camera 2 is recognized to be set at the regular charging position.

In FIG. 2A, if the digital camera 2 is pressed against the positioning stopper 54 in a state rotated by 90 degrees, the bottom face of the digital camera 2 covers the regular position detection sensor 38a and the card detection sensor 38b, but does not cover the wrong-direction detection sensor 38c. In this case, a message like "turn the camera 90 degrees and press it against the stopper" is displayed on the display 42, and until setting at the regular charging position is performed accordingly, no function for charging is started.

Next, a description will be given of the antenna driving mechanism 32 which permits the movable NFC antenna/IC 28 to move to the position corresponding to the digital camera NFC antenna 24. The antenna driving mechanism 32 includes a fixed rail 32a which extends in the X direction as in FIG. 2A, a movable rail 32b which can slide on the fixed rail 32a in the leftright direction on the plane of FIG. 2A, and a cursor 32c which can slide on the updown direction on the plane of FIG. 2A. Though omitted from illustration to avoid complication, a driving source for moving the movable rail 32b relative to the fixed rail 32a and a driving source for moving the cursor 32c relative to the movable rail 32b are provided for the movable rail 32b and the cursor 32c respectively. These driving sources are, for example, micromotors. The movable NFC antenna/IC 28 is mounted on the cursor 32c, and is thus freely movable two-dimensionally parallel to the charging surface 4a. Based on the output of the antenna controller 30, which monitors the relationship between the movable NFC antenna/IC 28 and the digital camera NFC antenna 24, the movable NFC antenna/IC 28 can be stopped still at the position corresponding to the digital camera NFC antenna 24.

When, based on the combination of the outputs of the regular position detection sensor 38a, the card detection sensor 38b, and the wrong-direction detection sensor 38c, the digital camera 2 is recognized to be set at the regular charging position, to avoid unnecessary movement, the movable NFC antenna/IC 28 is first moved from a communication position to an initial charging position. Here, the communication position is, for example, the center of the charging surface 4a, and the initial charging position is the average position of the digital camera NFC antenna 24 in various digital cameras.

FIG. 2B is a front view of the charge/data transfer station 4, and reveals the relationship between the digital camera 2 and the positioning stopper 54 and the positional relationship in the up-down direction between the digital camera 2 and the internal structure of the charge/data transfer station 4. It also reveals how the movable rail 32b straddling on the fixed rail 32a slides in the left-right direction on the plane of FIG. 2B and how the cursor 32c straddling on the movable rail 32b slides in the direction perpendicular to the plane of FIG. 2B.

FIGS. 3A and 3B are top views of the charge/data transfer station 4 in Example 1 in FIG. 1, and illustrate cases where different models of digital cameras 2 and 58 are placed on the charge/data transfer station 4. Such parts as appear also in FIGS. 2A and 2B are identified by common reference numerals, and no overlapping description will be repeated unless necessary. FIG. 3A, which is basically the same as FIG. 2A, shows a case where the proximity sensor has been moved up to the initial charging position. The movable NFC antenna/IC 28 is further moved as indicated by an arrow 56 from the initial charging position shown in FIG. 2A to the position corresponding to the digital camera NFC antenna 24. For the sake of simplicity, the antenna driving mechanism 32 for achieving that movement is omitted from illustration.

FIG. 3B shows a case where a different type of digital camera 58 is placed on the charge/data transfer station 4. This different type of digital camera 58 has different exterior dimensions, and has a digital camera NFC antenna 60 arranged differently. However, as in FIG. 3A, while the regular position detection sensor 38a and the wrong-direction detection sensor 38c are covered by the bottom face of the digital camera 58, the card detection sensor 38b is not covered. Thus, what is set is confirmed to be a digital camera, and the feed current for electromagnetic induction is supplied. As in FIG. 3A, the movable NFC antenna/IC 28 is moved as indicated by an arrow 62 from the initial charging position to the position corresponding to the digital camera NFC antenna 60.

Figure 4A:
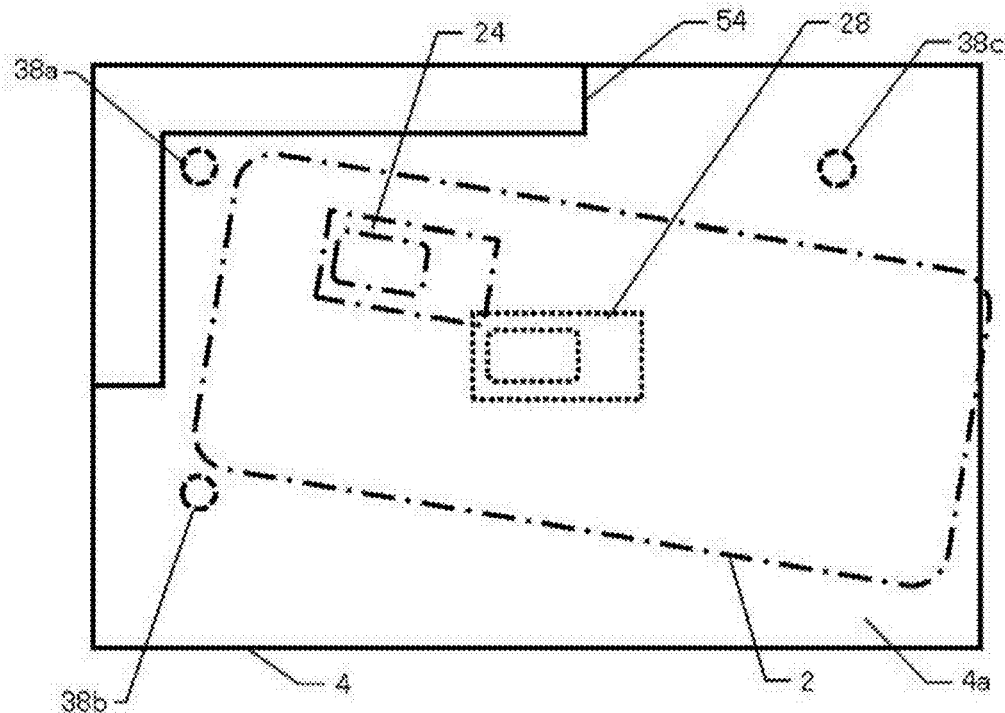
FIG. 4A is a top view (first state) of a digital camera placed, with no intension of charging, on the charge/data transfer station in Example 1.
Figure 4B:
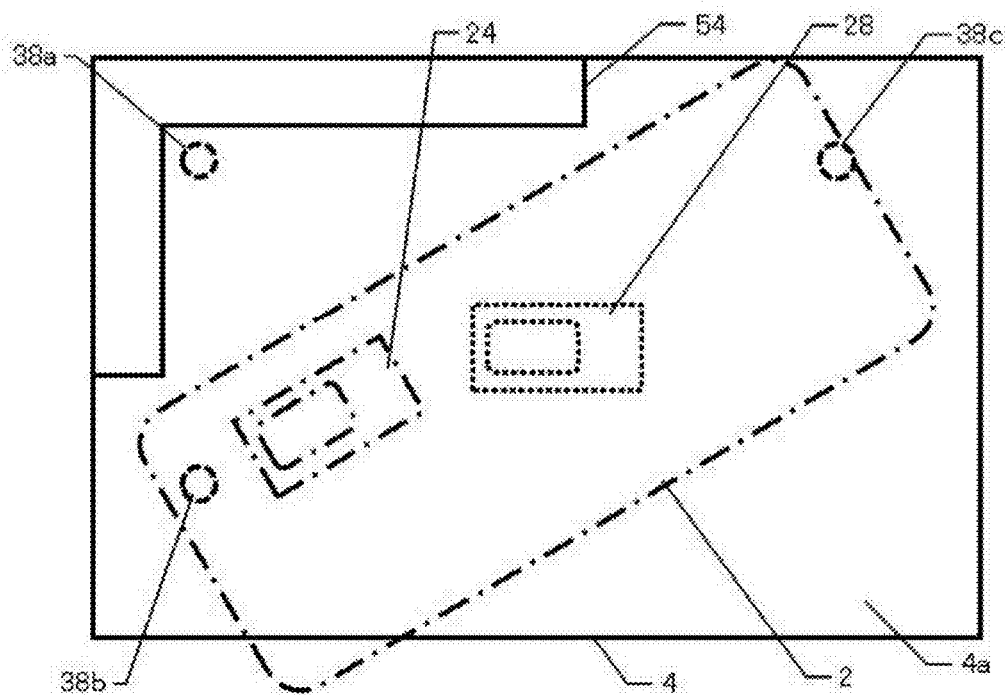
FIG. 4B is a top view (second state) of a digital camera placed, with no intension of charging, on the charge/data transfer station in Example 1.

FIGS. 4A and 4B are top views of the charge/data transfer station 4 in Example 1 in FIG. 1, and illustrate cases where the digital camera 2 is placed on the charge/data transfer station 4 with no intension of charging. Such parts as appear also in FIGS. 2A and 2B are identified by common reference numerals, and no overlapping description will be repeated unless necessary. In FIG. 4A, which is basically the same as FIG. 2A, the digital camera 2 is not pressed against the positioning stopper 54. As a result, none of the regular position detection sensor 38a, the card detection sensor 38b, and the wrong-direction detection sensor 38c are covered by the bottom face of the digital camera 2. In this state, based on the combination of the outputs of the regular position detection sensor 38a, the card detection sensor 38b, and the wrong-direction detection sensor 38c, the device placed on the charge/data transfer station 4 is judged not to be intended to be charged. As a result, the movable NFC antenna/IC 28 is kept at the same communication position irrespective of what device is placed, and the supply of the feed current for electromagnetic induction is inhibited. Only data transfer by NFC is performed.

FIG. 4B also shows a state where the digital camera 2 is not pressed against the positioning stopper 54, but here, the digital camera 2 is placed on the charge/data transfer station 4 in a different orientation than in FIG. 4A. In FIG. 4B, the regular position detection sensor 38a is not covered by the digital camera 2, while the card detection sensor 38b and the wrong-direction detection sensor 38c are covered by the digital camera 2. Also in this state, based on the combination of the outputs of the regular position detection sensor 38a, the card detection sensor 38b, and the wrong-direction detection sensor 38c, the device placed on the charge/data transfer station 4 is judged not to be intended to be charged. As a result, as in FIG. 4A, the movable NFC antenna/IC 28 is kept at the communication position, and the supply of the feed current for electromagnetic induction is inhibited. Only data transfer by NFC is performed.

As will be clear from FIGS. 4A and 4B, unless the regular position detection sensor 38a is covered, the device placed on the charge/data transfer station 4 is judged not to be intended to be charged, the movable NFC antenna/IC 28 is kept at the same communication position irrespective of what device is placed, and the supply of the feed current for electromagnetic induction is inhibited. Only data transfer by NFC is performed. Thus, so long as data transfer is intended, the digital camera 2 can be placed on the charge/data transfer station 4 at any position and in any orientation. As for data transfer by NFC, so long as the device is placed on the charge/data transfer station 4, it is located in the communication range of the movable NFC antenna/IC 28 kept at the communication position, and thus device recognition and information exchange are possible; accordingly, it is reasonable not to move the movable NFC antenna/IC 28 but keep it at the center of the charge/data transfer station 4.

Figure 5A:
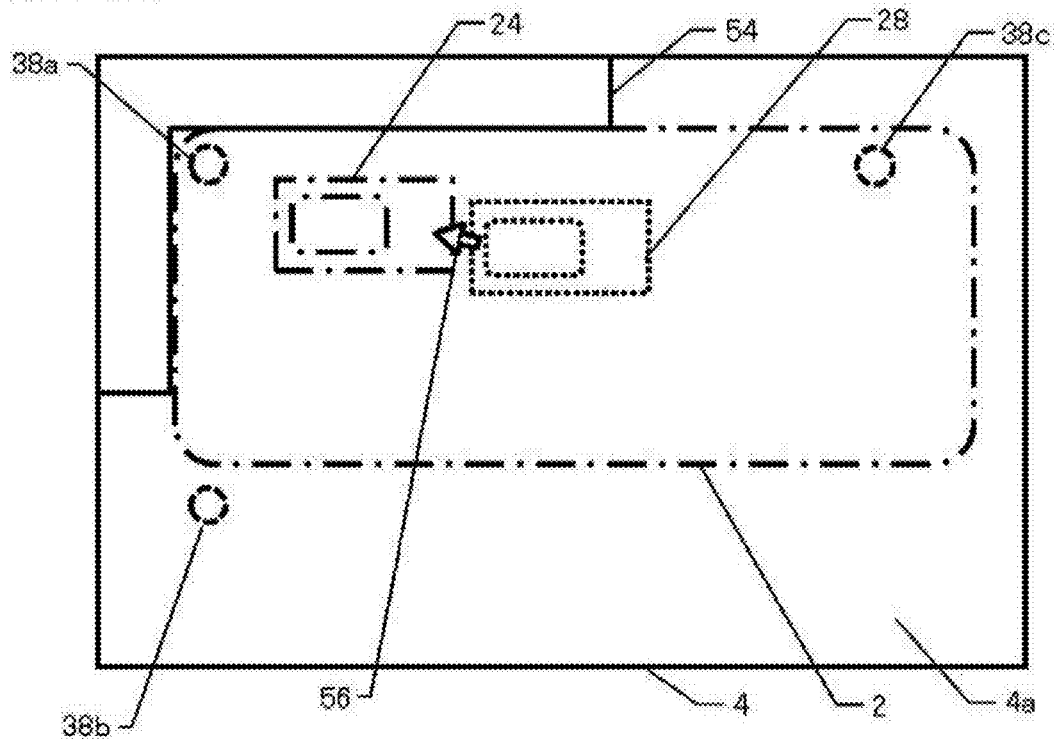
FIG. 5A is a top view (first state) of an IC card placed on the charge/data transfer station 4 in Example 1.
Figure 5B:
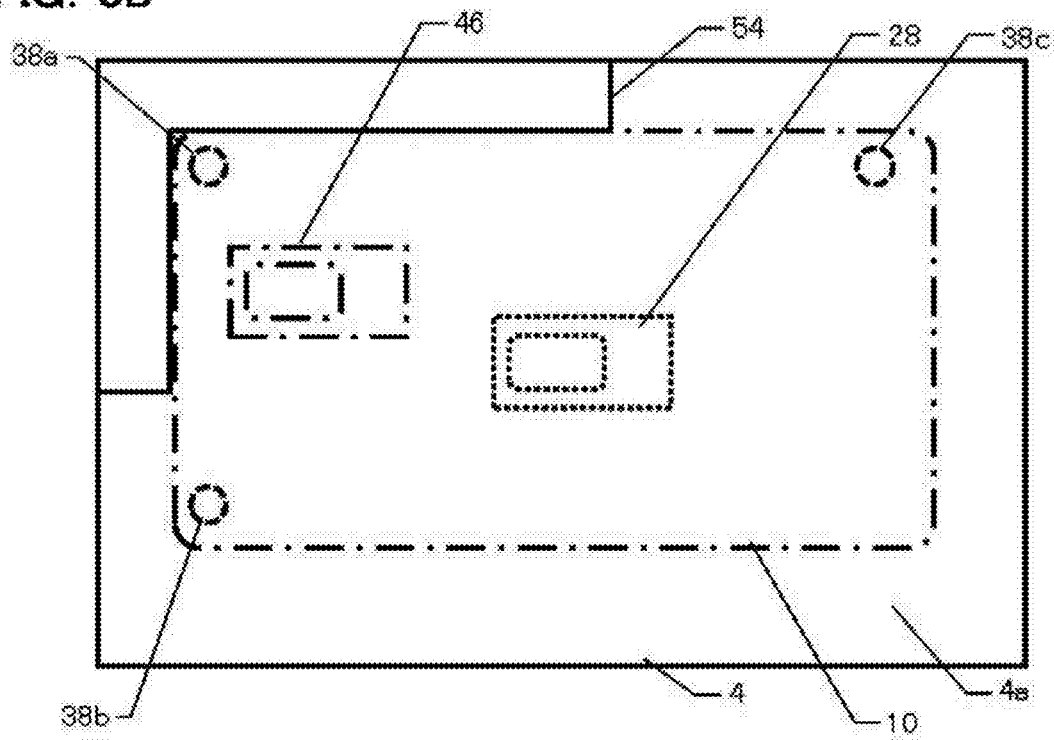
FIG. 5B is a top view (second state) of an IC card placed on the charge/data transfer station 4 in Example 1.

FIGS. 5A and 5B are top views of the charge/data transfer station 4 in Example 1 in FIG. 1, and illustrate a case where an IC card 10 is accidentally placed on the charge/data transfer station 4 with the IC card 10 pressed against the positioning stopper 54. Such parts as appear also in FIGS. 2A and 2B are identified by common reference numerals, and no overlapping description will be repeated unless necessary. FIG. 5A is identical with FIG. 3A.

By contrast, in FIG. 5B, the IC card 10 is placed on the charge/data transfer station 4 with the IC card 10 pressed against the positioning stopper 54. In this case, the regular position detection sensor 38a and the wrong-direction detection sensor 38c are covered by the IC card 10, but, having a larger width, the IC card 10 also covers the card detection sensor 38b. Thus, based on the combination of the outputs of the regular position detection sensor 38a, the card detection sensor 38b, and the wrong-direction detection sensor 38c, the device placed on the charge/data transfer station 4 is judged to be an IC card 10. As a result, as in FIG. 4A and the like, the movable NFC antenna/IC 28 is kept at the communication position, and the supply of the feed current for electromagnetic induction is inhibited. Only data transfer by NFC is performed. The card NFC antenna 46 is in the communication range of the movable NFC antenna/IC 28 kept at the communication position, and thus it is possible to recognize the IC card 10 and exchange information. Placing the IC card 10 in states like those in FIGS. 4A and 4B leads to the same result.

Figure 6:
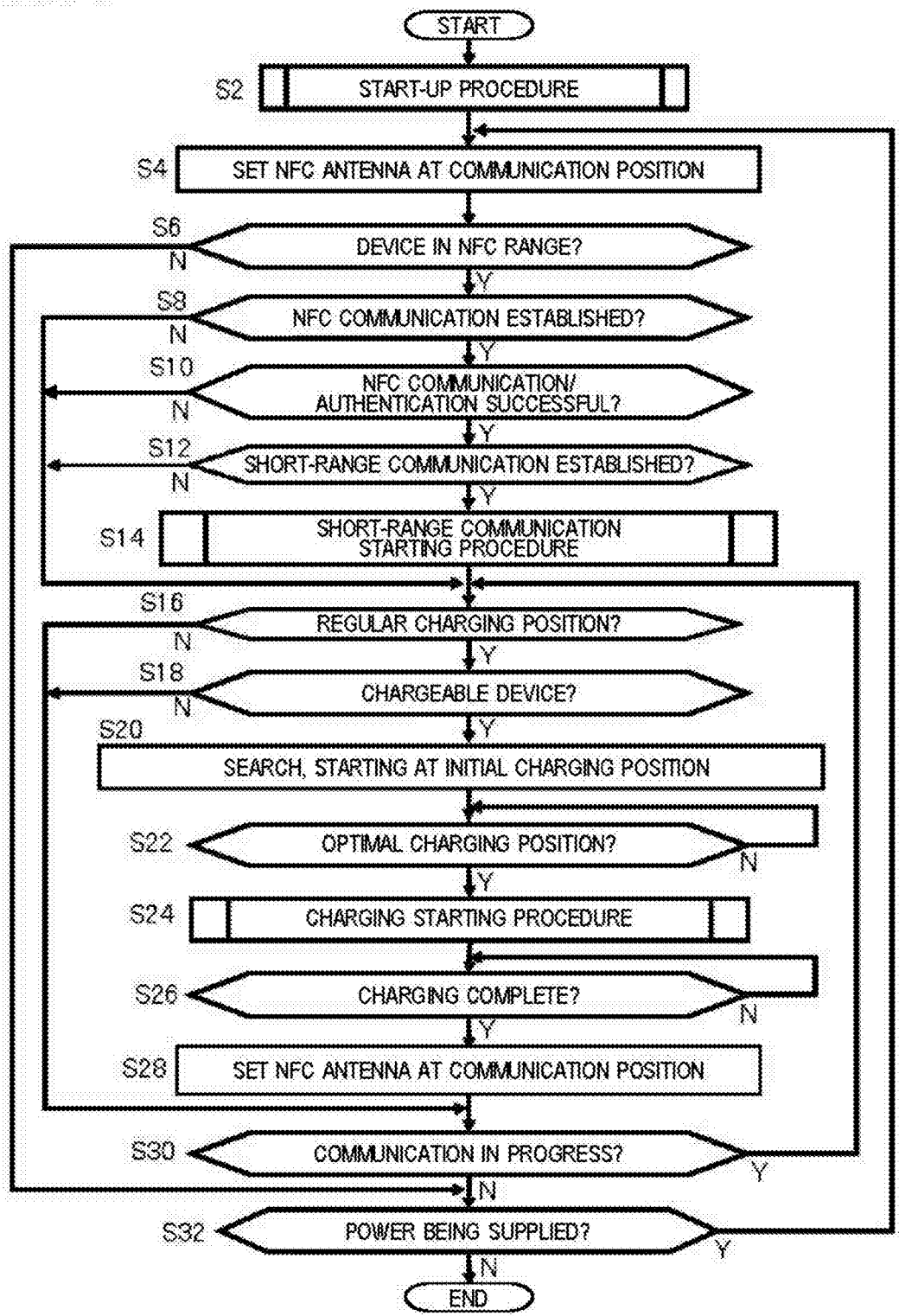
FIG. 6 is a basic flow chart illustrating the operation of a PC controller in Example 1.

FIG. 6 is a basic flow chart illustrating the operation of the PC controller 48 in Example 1 described above. The personal computer 6 performs various functions, of which only those related to charging and communication performed with respect to the device placed on the charge/data transfer station 4 are extracted in the flow in FIG. 6. That is, the flow actually gone through by the personal computer 6 involves various functions other than those illustrated. The flow in FIG. 6 starts when the power to the PC power supply 52 is turned on. At step S2, a start-up procedure is performed, and the flow then proceeds to step S4.

At step S4, the movable NFC antenna/IC 28 is set at the communication position, and then, at step S6, it is checked whether or not another device is present in the communication range of the movable NFC antenna/IC 28. If any such device is present, then, at step S8, it is checked whether or not NFC communication with the device has been established. If communication is established, then, at step S10, it is checked whether or not predetermined NFC communication has been conducted and whether or not, by authentication by NFC communication, the device has been authenticated as a model with which to proceed to short-range communication. If the predetermined NFC communication and the authentication have been successful, the flow proceeds to step S12. At step S12, it is checked whether or not short-range communication with the authenticated device has been established, and if it has been established, then at step S14, a procedure for starting predetermined short-range communication (for example, transfer of image data) is performed. The flow then proceeds to step S16.

On the other hand, if, at step S8, NFC communication with the device cannot be established, or if, at step S10, the predetermined NFC communication and authentication of the device by NFC communication are unsuccessful, or if, at step S12, short-range communication with the authenticated device cannot be confirmed to be established, the flow proceeds immediately to step S16. When the flow proceeds directly from step S12 to step S16, the predetermined NFC communication or the authentication as an NFC communication device have been complete.

At step S16, whether or not the device with which NFC communication has been established is placed at the regular charging position is checked based on the output of the proximity sensor 38. If the device is placed at the regular charging position, then, at step S18, by NFC communication, it is checked whether or not the device is a chargeable one. If it is a chargeable device, first the movable NFC antenna/IC 28 is moved from the communication position to the initial charging position, and then, based on information from the antenna controller 30, the optimal position for charging (the state where the movable NFC antenna/IC 28 is located at the position corresponding to the digital camera NFC antenna 24 so that the strongest electromagnetic induction is obtained) is searched for. The search proceeds by trial and error.

At step S22, it is checked whether or not the optimal charging position has been determined and, until it is determined, trial and error continues. When, at step S22, the optimal charging position is determined, then, at step S24, a procedure for starting the supply of the feed current for electromagnetic induction from the charge controller 34 to the movable NFC antenna/IC 28 is performed, and then the flow proceeds to step S26.

At step S26, whether or not the charging is complete is checked and, until the charging is complete, step S26 is repeated. If a task arises during this repetition, an interrupt is triggered at any time so that the repetition of step S26 is left for a while to perform the task until, when there is no longer any other task, step S26 is resumed. When, at step S26, the charging is confirmed to be complete, the flow proceeds to step S28. In practice, the check at step S26 is performed periodically throughout the overall flow of the PC controller 48 so that, unless the charging is complete, the overall flow is continued and, when the charging is confirmed to be complete, the flow proceeds to step S28.

At step S28, the movable NFC antenna/IC 28 is moved back to the communication position, and the flow then proceeds to step S30. If, at step S16, the device is not confirmed to be placed at the regular charging position, or if, at step S18, the device is not confirmed to be a chargeable one, then the flow proceeds immediately to step S30. Thus, if the device is not confirmed to be placed at the regular charging position, the supply of the feed current for electromagnetic induction is inhibited.

At step S30, it is checked whether or not NFC communication or communication by short-range communication is in progress. If communication is in progress, the flow returns to step S16, and thereafter, until communication is confirmed to have ceased at step S30, steps S16 through S30 are repeated. The aim is to start a charging procedure when a device, at first placed on the charge/data transfer station 4 with no intention to charge, is set afresh at the regular charging position at the user's will.

If, at step S30, no communication is confirmed to be in progress, the flow proceeds to step S32. If, at step S6, no device is present in the NFC range (that is, if no device is placed on the charge/data transfer station 4), the flow proceeds immediately to step S32. At step S32, it is checked whether or not electric power is being supplied to the personal computer 6. If electric power is being supplied, the flow returns to step S4, and thereafter, unless electric power is confirmed to have ceased to be supplied, steps S2 through S32 are repeated to remain on standby in preparation for a device being newly placed on the charge/data transfer station 4. On the other hand, if, at step S32, electric power is confirmed to have ceased to be supplied, the flow ends.

Example 2

Figure 7:
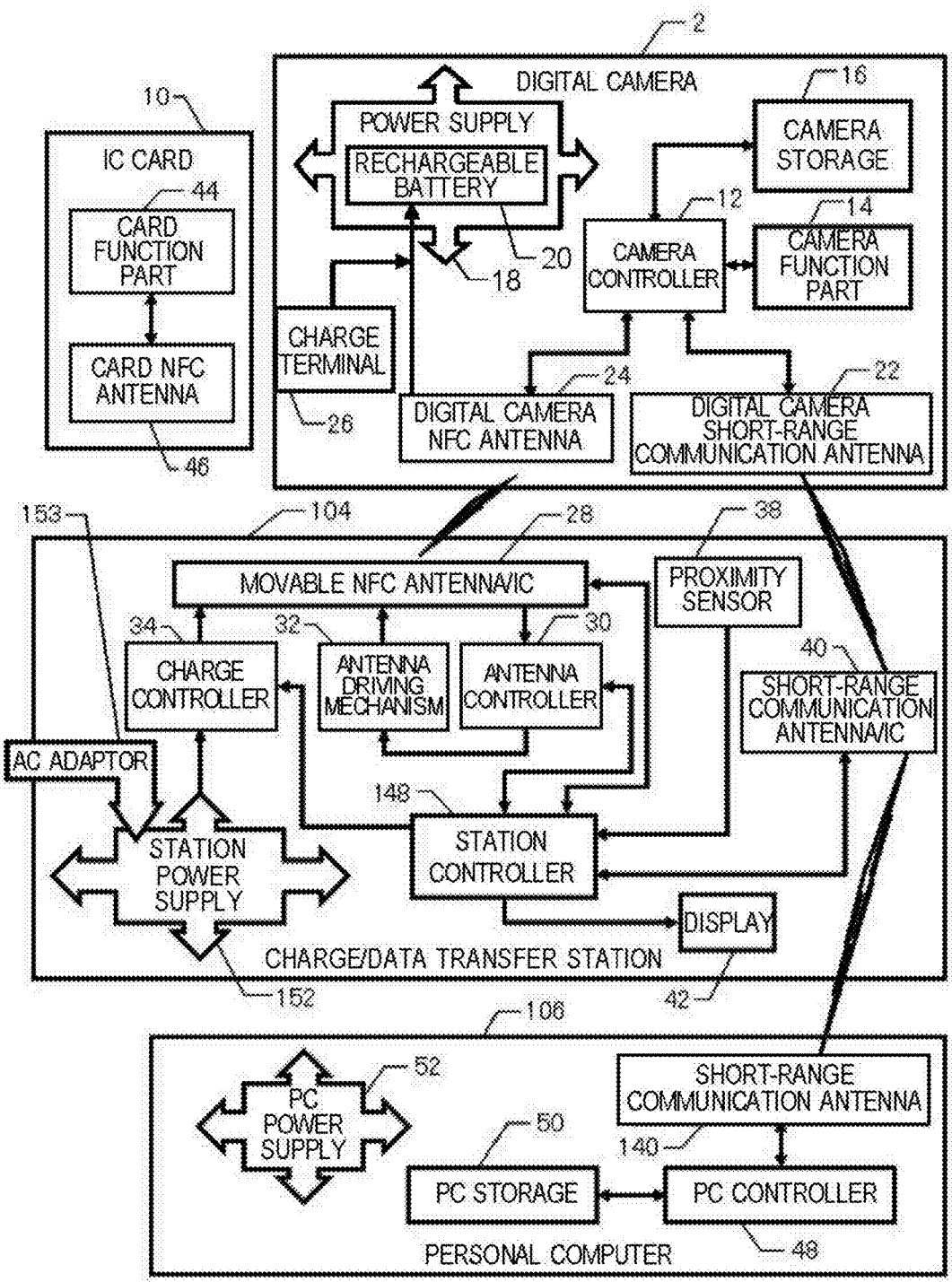
FIG. 7 is a block diagram showing the overall configuration of Example 2 embodying the present invention (Example 2)

FIG. 7 is a block diagram showing the overall configuration of a charging system of Example 2 embodying the present invention. Example 2 has much in common with Example 1; accordingly, corresponding parts are identified by common reference numerals, and no overlapping description will be repeated unless necessary. Example 2 shown in FIG. 7 differs from Example 1 shown in FIG. 1 in that a charge/data transfer station 104 itself includes a station controller 148 and a station power supply 152 based on the supply of electric power from an AC adapter 153. Accordingly, the functions of the PC controller 48 in Example 1 are assumed by the station controller 148 in Example 2. In other words, the flow described with reference to FIG. 6 is performed by the station controller 148 in Example 2.

Moreover, in Example 2 in FIG. 7, communication such as transfer of image data between the charge/data transfer station 104 and a personal computer 106 is conducted by short-range communication by a short-range communication antenna/IC 40 in the charge/data transfer station 104 and a short-range communication antenna 140 in the personal computer 106. On the other hand, image data communication between the digital camera 2 and the personal computer 106 may be conducted, after the digital camera 2 has been authenticated by NFC communication by the charge/data transfer station 104, directly between a digital camera short-range communication antenna 22 and the short-range communication antenna 140 of the personal computer 106.

Example 3

Figure 8:
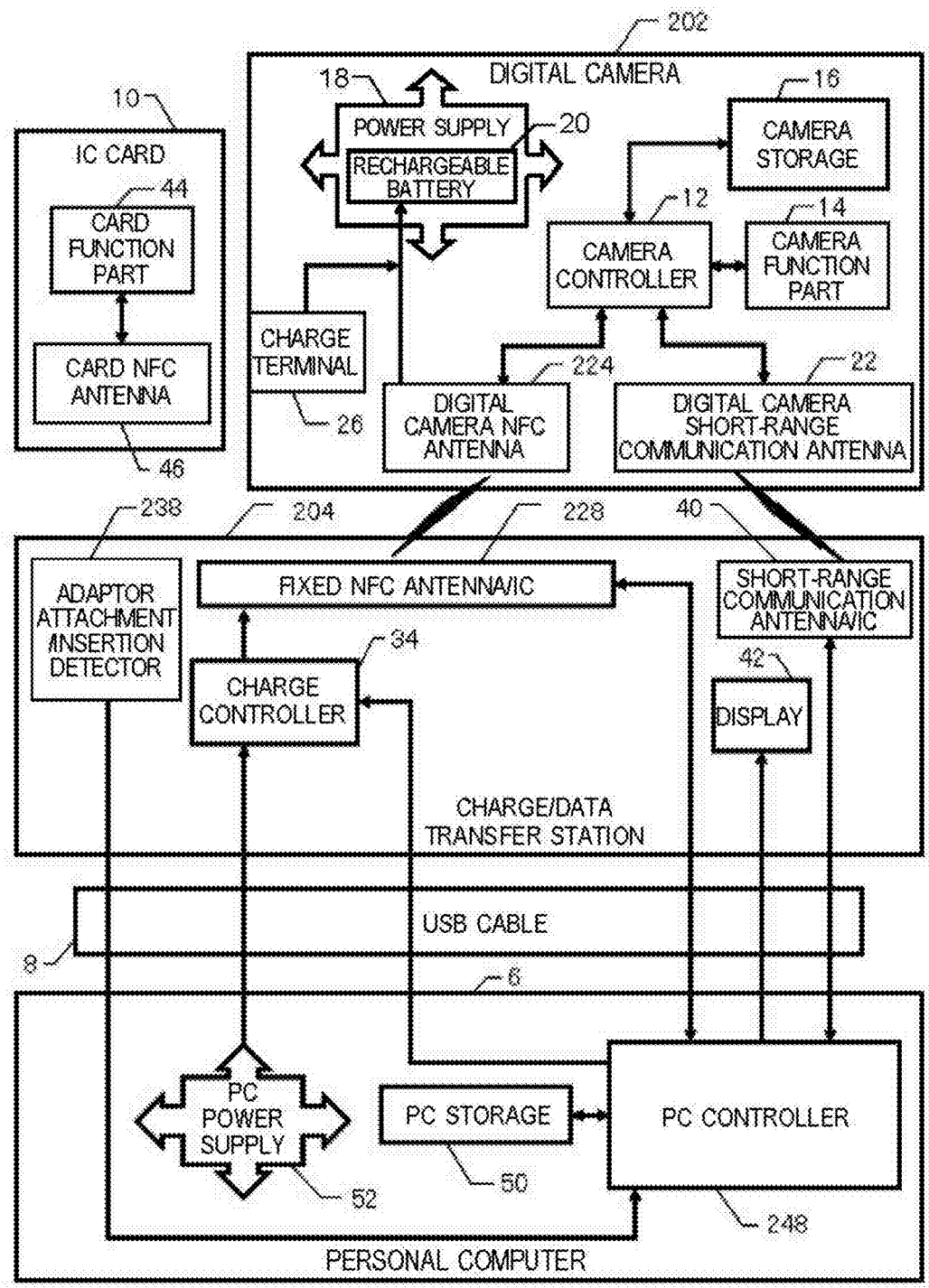
FIG. 8 is a block diagram showing the overall configuration of Example 3 embodying the present invention (Example 3)

FIG. 8 is a block diagram showing the overall configuration of a charging system of Example 3 embodying the present invention. Example 3 has much in common with Example 1; accordingly, corresponding parts are identified by common reference numerals, and no overlapping description will be repeated unless necessary. Example 3 shown in FIG. 8 differs from Example 1 shown in FIG. 1 in that, to cope with a digital camera NFC antenna 224 arranged at different positions in different models of digital cameras 202, and to cope with an IC card 10 being likely to be broken by electromagnetic induction, a charge/data transfer station 204 is used in combination with an adapter and is provided with an adapter attachment/insertion detector 238.

Specifically, in Example 3 in FIG. 8, interchangeable adapters dedicated to different digital cameras 202 are prepared, and by use of such an adapter, any digital camera 202 can be guided such that its digital camera NFC antenna 224 is always brought to the position corresponding to a fixed NFC antenna/IC 228. Accordingly, in Example 3, the charge/data transfer station 204 adopts a fixed NFC antenna/IC 228, and there is no need for an antenna driving mechanism 32 or an antenna controller 30 like those in Example 1. Moreover, as will be described later, the adapter is so shaped as to prevent the card NFC antenna 46 of an IC card 10 from approaching a place where strong electromagnetic induction is present. The adapter will be described in detail later. Moreover, in Example 3 in FIG. 8, based on the detection output of the adapter attachment/insertion detector 238, when no adapter as mentioned above is attached and an IC card 10 is likely to approach such a place, a PC controller 248 inhibits the supply of the feed current for electromagnetic induction to the fixed NFC antenna/IC 228. Moreover, based on the detection output of the adapter attachment/insertion detector 238, when a digital camera 202 is inserted in the charge/data transfer station 204 to which the adapter is attached, the PC controller 248 supplies the fixed NFC antenna/IC 228 with the feed current for electromagnetic induction.

Figure 9A:
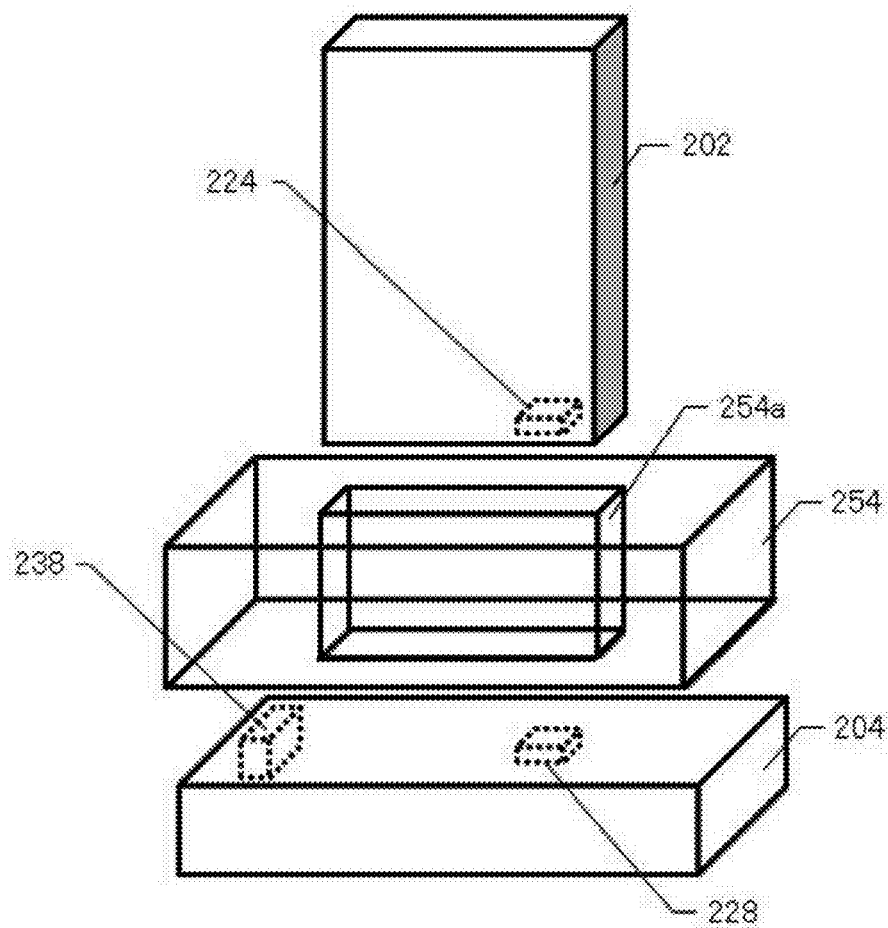
FIG. 9A is a perspective view (first state) of Example 3.
Figure 9B:
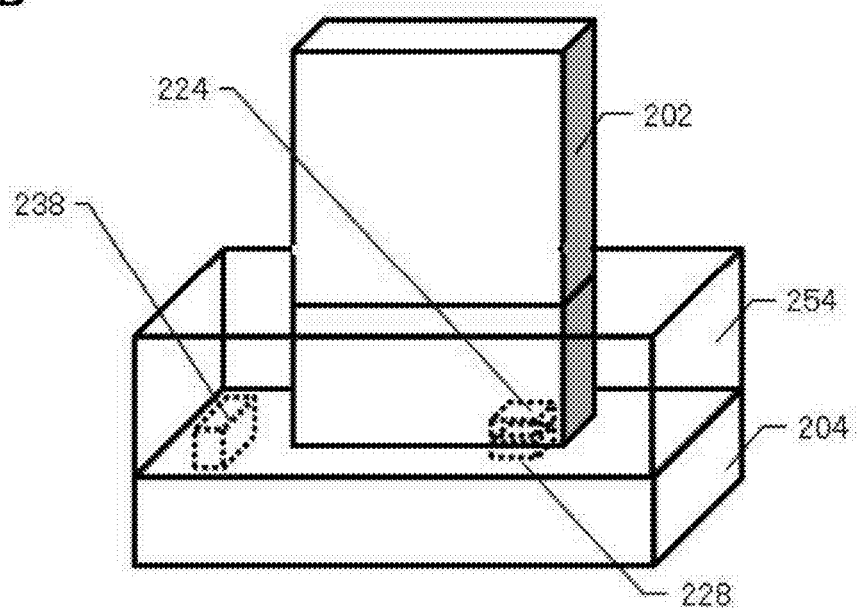
FIG. 9B is a perspective view (second state) of Example 3.

FIGS. 9A and 9B are perspective views of a charge/data transfer station 204, a digital camera 202, and an adapter 254 dedicated to the digital camera 202 in Example 3. FIG. 9A shows a state where the adapter 254 is detached from the charge/data transfer station 204. The adapter 254 has formed in it a through-hole 254a so sized as to permit the digital camera 202 to fit snugly in it. The adapter 254 is formed of a transparent material to allow a check for the presence, inside the through-hole 254a, of a foreign body that may obstruct electromagnetic induction. Furthermore, since the through-hole 254a has no bottom, any foreign body inside can easily be swept out.

In a state where the adapter 254 is detached as in FIG. 9A, as in Example 1 shown in FIGS. 4A and 4B, a device can be placed on the charge/data transfer station 204 at any position and in any orientation. Moreover, in the state in FIG. 9A, the adapter attachment/insertion detector 238 detects no adapter 254 being attached; thus, the supply of the feed current for electromagnetic induction to the fixed NFC antenna/IC 228 is inhibited.

FIG. 9B shows a state where the adapter 254 is attached to the charge/data transfer station 204 and the digital camera 202 is inserted. With the adapter 254 attached to it in this way, the charge/data transfer station 204 functions as a cradle charger dedicated to the digital camera 202. The attachment can be achieved with any means of attachment such as with a flat fastener or by snapping-in. For easy positioning at the time of attachment, in a case where fastening by adhesion is adopted as a means of attachment, as shown in FIG. 9B, the charge/data transfer station 204 and the adapter 254 have the same shapes at their respective front, rear, right, and left side faces. Thus, when the two are coupled together such that their respective front, rear, right, and left side faces are all flush with each other, the through-hole 254a and the fixed NFC antenna/IC 228 are positioned properly relative to each other. When the attachment is complete, the top face of the charge/data transfer station 204 serves as the bottom of the through-hole 254a to form a digital camera slot. In a bottom part of the digital camera 202, the digital camera NFC antenna 224 is arranged, and as the digital camera 202 is guided through the through-hole 254a, it is brought to the position corresponding to the fixed NFC antenna/IC 228.

In the state in FIG. 9B, the adapter attachment/insertion detector 238 first confirms that the adapter 254 is attached to the charge/data transfer station 204 so that, on that condition, the feed current for electromagnetic induction is supplied. Moreover, when the digital camera 202 is inserted in the through-hole 254a as in FIG. 9B, the adapter attachment/insertion detector 238 detects that and enables the supply of the feed current for electromagnetic induction.

Figure 10A:
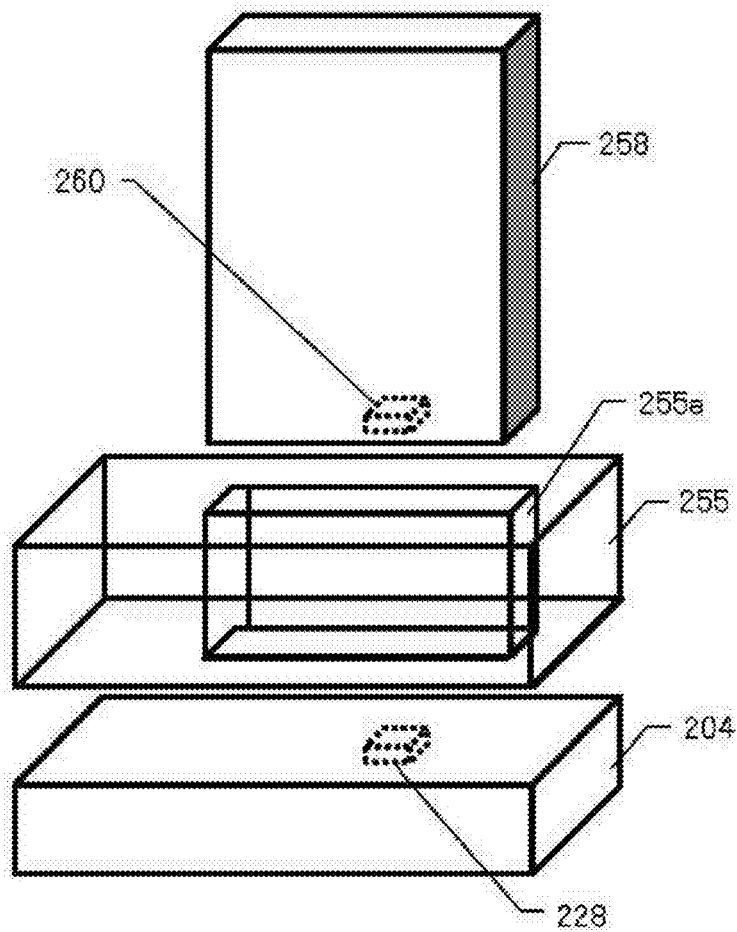
FIG. 10A is a perspective view (first state) of a charge/data transfer station, along with a different model of digital camera, in Example 3.
Figure 10B:
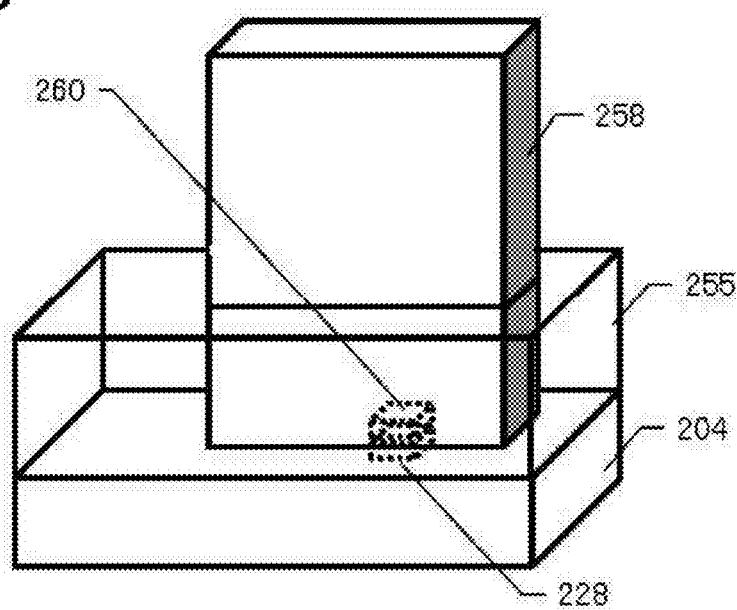
FIG. 10B is a perspective view (second state) of the charge/data transfer station, along with a different model of digital camera, in Example 3.

FIGS. 10A and 10B are perspective views of a charge/data transfer station 204, a different model of digital camera 258, and an adapter 255 dedicated to the different model of digital camera 258 in Example 3. FIGS. 10A and 10B correspond to FIGS. 9A and 9B respectively. Also in the adapter 255 in FIGS. 10A and 10B, a through-hole 255a so sized as to permit the different model of digital camera 258 to fit snugly in it is provided. The position of the through-hole 255a is determined with reference to the front, rear, left, and right side faces of the adapter 255 so that a digital camera NFC antenna 260 arranged in a bottom part of the different model of digital camera 258 is, as this is guided through the through-hole 255a, brought to the position corresponding to the fixed NFC antenna/IC 228 arranged at the top face of the charge/data transfer station 204. In this way, by preparing adapters dedicated to different digital cameras, it is possible, irrespective of the model of the digital camera, to guide the digital camera NFC antenna to the position corresponding to the fixed NFC antenna/IC 228 in the charge/data transfer station 204.

Figure 11A:
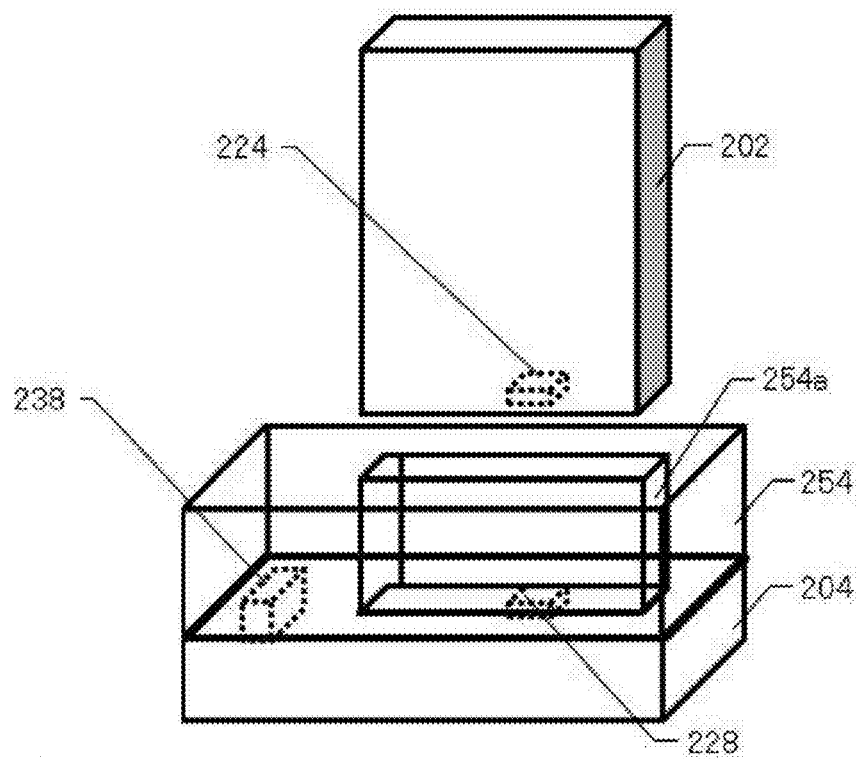
FIG. 11A is a perspective view (first state) illustrating the relationship between Example 3 and an IC card.
Figure 11B:
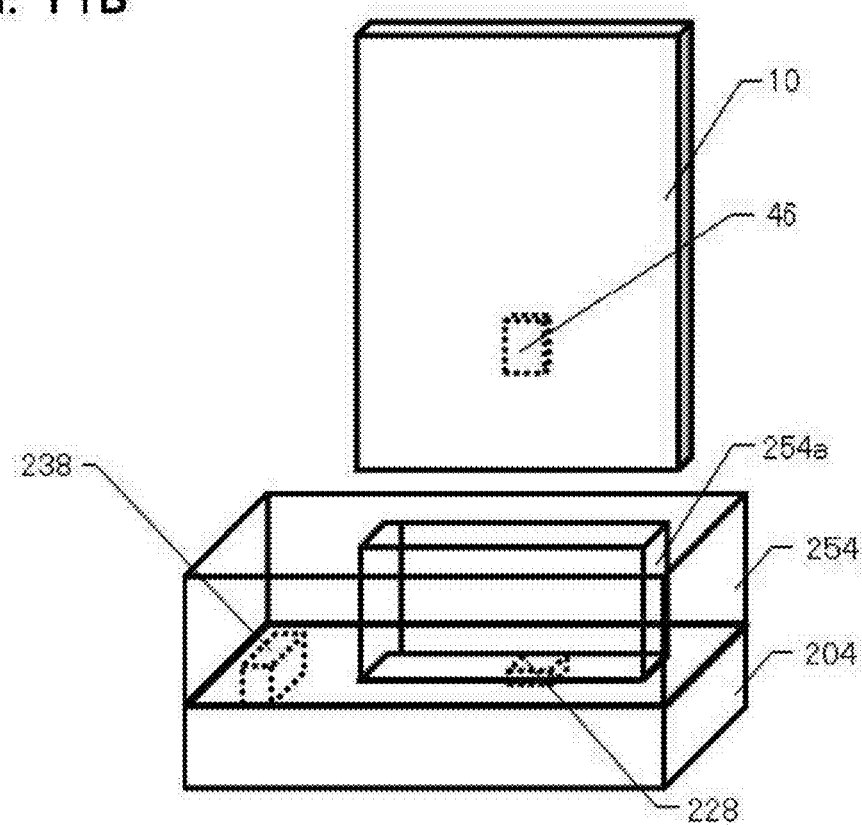
FIG. 11B is a perspective view (second state) illustrating the relationship between Example 3 and an IC card.

FIGS. 11A and 11B 10B are perspective views of a charge/data transfer station 204, a digital camera 202, an adapter 254 dedicated to the digital camera 202, and an IC card 10 in Example 3. FIG. 11A, while being similar to FIG. 9B, shows a state before the digital camera 202 is inserted. Since the adapter 254 is dedicated to the digital camera 202, the digital camera 202 can be inserted from the state in FIG. 11A to the state in FIG. 9B.

By contrast, FIG. 11B shows a state where the IC card 10 is about to be inserted accidentally in the through-hole 254*a*. However, the IC card 10, having a larger width than that of the through-hole 254*a*, cannot be inserted. In the state in FIG. 11B, the adapter 254 is coupled to the charge/data transfer station 204, and therefore one of the conditions for supplying the feed current for electromagnetic induction is fulfilled; however, since the IC card 10 cannot be inserted, the IC card 10 is not broken by electromagnetic induction.

While a digital camera 202 generally has a comparatively small width, for one with a large width like the different model of digital camera 258 in FIGS. 10A and 10B, the adapter 255 has a through-hole 255*a* with an accordingly large width. The IC card 10 is then likely to be inserted accidentally. However, even though it can be inserted, as will be seen from FIG. 11B, the IC card 10 cannot be inserted in a state where the orientation of the antenna coil of the card NFC antenna 46 is parallel to the antenna coil of the fixed NFC antenna/IC 228 in the charge/data transfer station 204. In this way, the adapter 254 coupled to the charge/data transfer station 204 is useful also from the viewpoint of preventing the antenna coil of the IC card NFC antenna 46 from approaching, in a parallel state, the antenna coil of the fixed NFC antenna/IC 228 in the charge/data transfer station 204 and thereby preventing strong electromagnetic induction from occurring.

Figure 12:
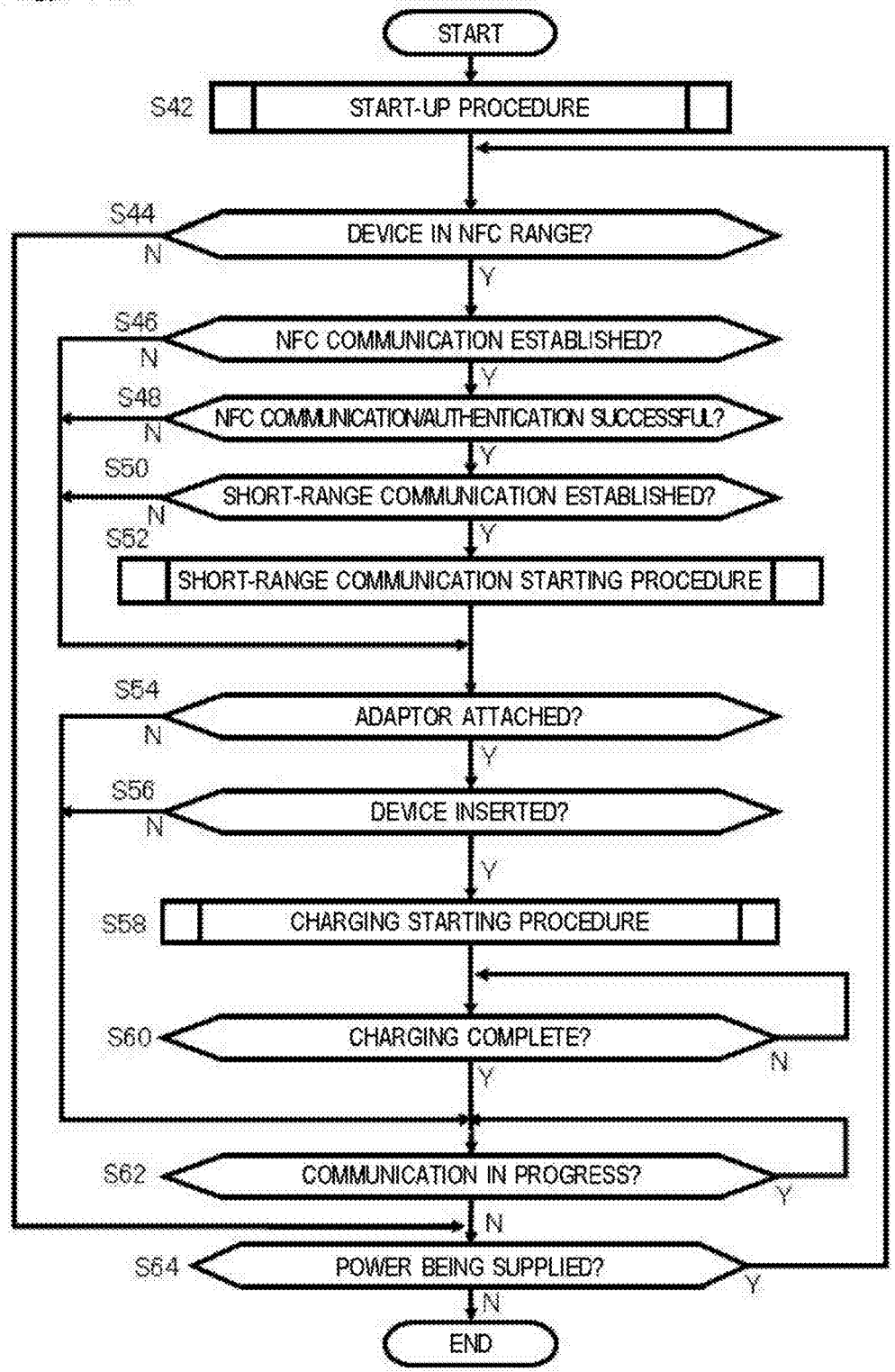
FIG. 12 is a basic flow chart illustrating the operation of a PC controller in Example 3.

FIG. 12 is a basic flow chart illustrating the operation of the PC controller 248 in Example 3 described above. As in FIG. 6, only those functions related to charging and communication performed with respect to the device placed on the charge/data transfer station 204 are extracted. Also the flow in FIG. 12 starts when the power to the PC power supply 52 is turned on. At step S42, a start-up procedure is performed, and the flow then proceeds to step S44.

At step S44, it is checked whether or not another device is present in the communication range of the fixed NFC antenna/IC 228. If any such device is present, then, at step S46, it is checked whether or not NFC communication with the device has been established. If communication is established, then, at step S48, it is checked whether or not predetermined NFC communication has been conducted and whether or not, by authentication by NFC communication, the device has been authenticated as a model with which to proceed to short-range communication. If the predetermined NFC communication and the authentication have been successful, the flow proceeds to step S50. At step S50, it is checked whether or not short-range communication with the authenticated device has been established, and if it has been established, then at step S52, a procedure for starting predetermined short-range communication is performed, and then the flow proceeds to step S54.

On the other hand, if, at step S46, NFC communication with the device cannot be established, or if, at step S48, the predetermined NFC communication and the authentication of the device by NFC communication are unsuccessful, or if, at step S50, short-range communication with the authenticated device cannot be confirmed to be established, the flow proceeds immediately to step S54. When the flow proceeds directly from step S50 to step S54, the predetermined NFC communication and the authentication as an NFC communication device have been complete.

At step S54, based on the detection signal from the adapter attachment/insertion detector 238, it is checked whether or not an adapter is attached to the charge/data transfer station 204. If an adapter is attached, then, at step S56, it is checked whether or not a device is inserted in the through-hole in the adapter. If, based on the detection signal from the adapter attachment/insertion detector 238, a device is recognized to be inserted, then, at step S58, a procedure for starting the supply of the feed current for electromagnetic induction from the charge controller 34 to the fixed NFC antenna/IC 228 is performed, and then the flow proceeds to step S60.

At step S60, whether or not the charging is complete is checked and, until the charging is complete, step S60 is repeated. When, at step S60, the charging is confirmed to be complete, the flow proceeds to step S62. IF, at step S54, no adapter is recognized to be attached, or if, at step S56, no device is recognized to be inserted in the through-hole, the flow proceeds immediately to step S62. In this way, unless both an adapter is confirmed to be attached and a device is confirmed to be inserted, the supply of the feed current for electromagnetic induction is inhibited.

At step S62, it is checked whether or not NFC communication or communication by short-range communication is in progress, and so long as communication is in progress, step S62 is repeated. If, at step S62, communication is confirmed not to be in progress, the flow proceeds to step S64. If, at step S44, no device is present in the NFC range (that is, if no device is inserted in an adapter, or if no device is placed on the charge/data transfer station 204 with no adapter attached to it), the flow proceeds immediately to step S64. At step S64, it is checked whether or not electric power is being supplied to the personal computer 6. If electric power is being supplied, the flow returns to step S44, and thereafter, unless electric power is confirmed to have ceased to be supplied at step S64, steps S44 through S64 are repeated to remain on standby in preparation for an adapter being newly attached, a device being newly inserted in an adapter, or a device being placed on the charge/data transfer station 204 with no adapter attached to it. On the other hand, if, at step S64, electric power is confirmed to have ceased to be supplied, the flow ends.

Example 4

Figure 13A:
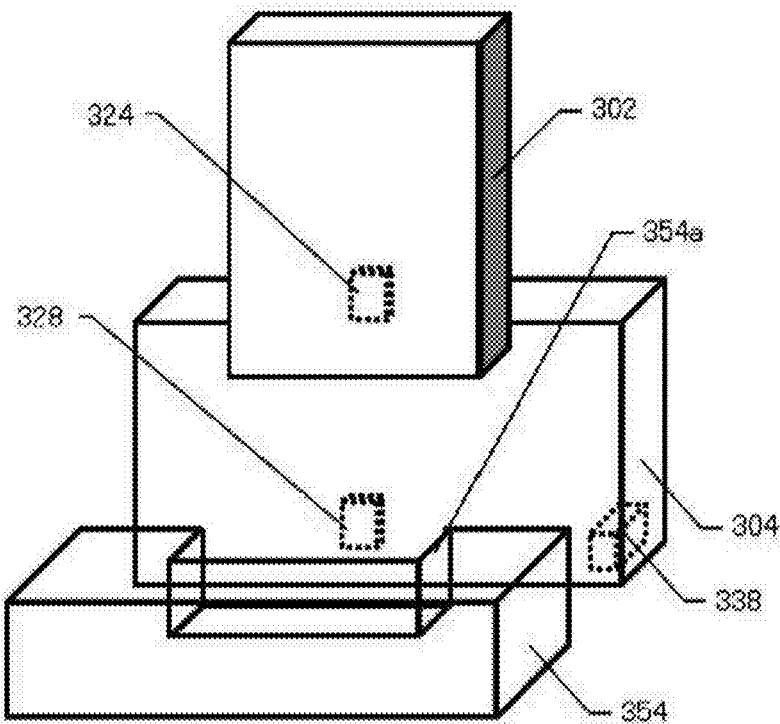
FIG. 13A is a perspective view (first state) of Example 4 embodying the present invention (Example 4)
Figure 13B:
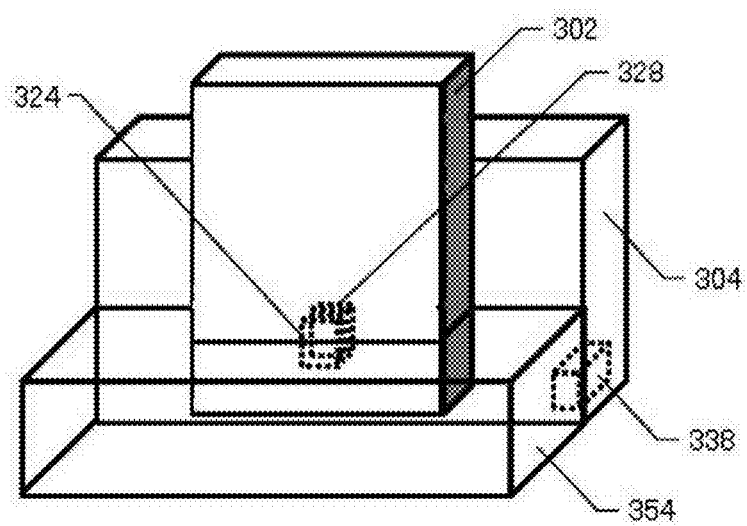
FIG. 13B is a perspective view (second state) of Example 4 embodying the present invention (Example 4)

FIGS. 13A and 13B are perspective views of a charge/data transfer station 304, a digital camera 302, and an adapter 354 dedicated to the digital camera 302 in a charging system of Example 4 embodying the present invention. FIG. 13A shows a state where the adapter 354 is detached from the charge/data transfer station 304, and FIG. 13B shows a state where the adapter 354 is attached to the charge/data transfer station 304 and the digital camera 302 is inserted.

As will be clear from FIGS. 13A and 13B, Example 4 shown there, like Example 3 in FIGS. 9A and 9B, includes an adapter. However, in contrast to Example 3 in FIGS. 9A and 9B, where the adapter 254 forms the front, rear, left, and right side faces of the digital camera slot and the charge/data transfer station 204 forms the bottom face of the digital camera slot, in Example 4 in FIGS. 13A and 13B, the charge/data transfer station 304 forms one side face of digital camera slot and a recess 354*a* in the adapter 354 forms the other side faces and the bottom face of the digital camera slot. Moreover, in contrast to Example 3 in FIGS. 9A and 9B, where the digital camera NFC antenna 224 is arranged at the bottom face in the insertion direction, in Example 4 in FIGS. 13A and 13B, a digital camera NFC antenna 324 is arranged at the front face (or rear face) of the digital camera 302.

In other respects, Example 4 in FIGS. 13A and 13B is similar to Example 3 in FIGS. 9A and 9B. Also similarly, interchangeable adapters dedicated to different models of digital cameras are prepared, and by use of such an adapter, any digital camera can be guided such that its digital camera NFC antenna 324 is always brought to the position corresponding to a fixed NFC antenna/IC 328. Further similarly, the adapter 354 is transparent to allow a check for the presence, inside the digital camera slot, of a foreign body that may obstruct the electromagnetic induction, and any foreign body there can easily be swept out. A difference is that, in Example 4 in FIGS. 13A and 13B, the recess 354a lacks one side face.

In Example 4 in FIGS. 13A and 13B, when the bottom face in the insertion direction has a large width, the recess 354a too has a large width; thus, the IC card 10 is likely to be inserted accidentally. Thus, in Example 4, if the IC card 10 is inserted accidentally, the antenna coil of the IC card NFC antenna 46 and the antenna coil of the fixed NFC antenna/IC 328 in the charge/data transfer station 304 are likely to approach each other in a parallel state.

Figure 14A:
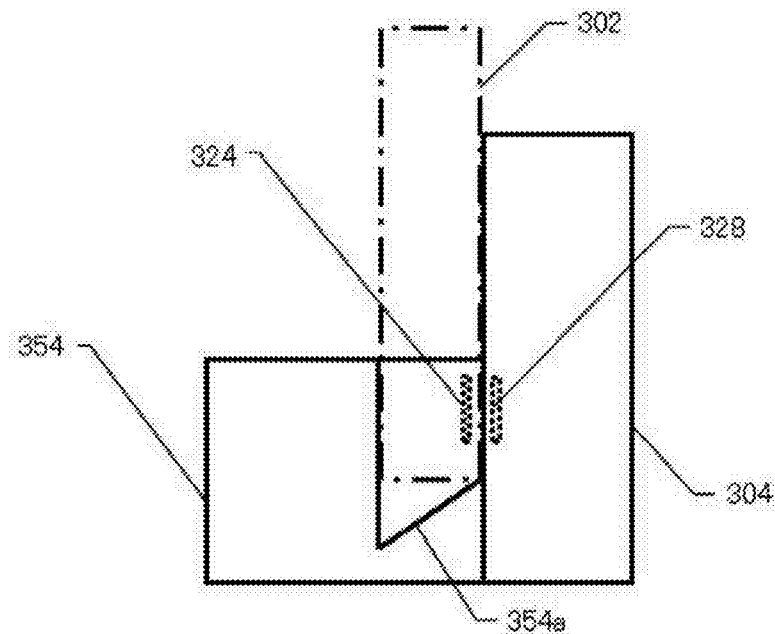
FIG. 14A is a side sectional view (first state) of an adapter with a recess wider than an IC card in Example 4.
Figure 14B:
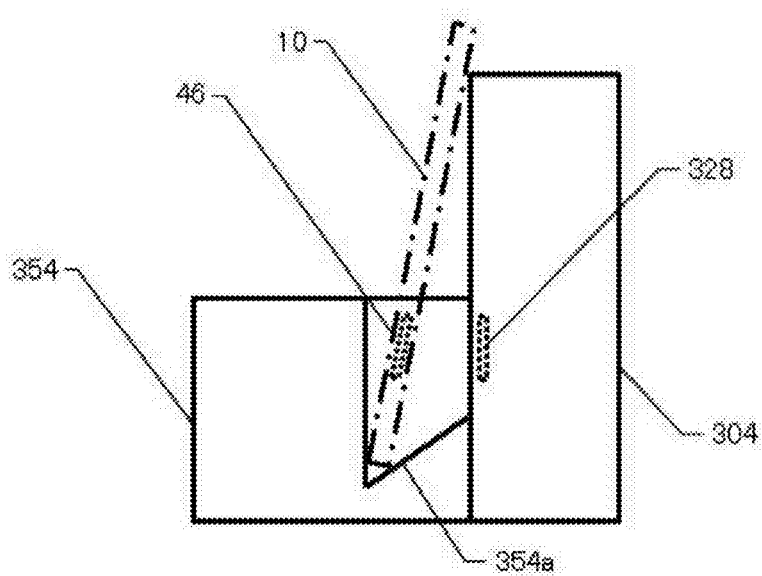
FIG. 14B is a side sectional view (second state) of an adapter with a recess wider than an IC card in Example 4.

FIGS. 14A and 14B are side sectional views of an adapter that has such a recess 354a with a larger width than the width of an IC card, and show a structure for preventing, when the IC card 10 is inserted accidentally, the antenna coil of the IC card NFC antenna 46 and the antenna coil of the fixed NFC antenna/IC 328 in the charge/data transfer station 304 from approaching each other in a parallel state. Such parts as appear also in FIGS. 13A and 13B are identified by common reference numerals, and no overlapping description will be repeated. As will be clear from FIGS. 14A and 14B, in an adapter 354 in which an IC card 10 is likely to be inserted accidentally, the recess 354a is given an inclined bottom face.

FIG. 14A shows a case where the regular digital camera 302 is inserted, and the digital camera NFC antenna 324 is brought to close to the position corresponding to the fixed NFC antenna/IC 328. In a case where the regular digital camera 302 is inserted, its thickness fits the recess 354a, and thus even though the recess 354a has an inclined bottom face, the digital camera 302 does not sink deeper than a predetermined position. By contrast, FIG. 14B shows a case where an IC card 10 is inserted accidentally. Since the IC card 10 is thin, it slides downward along the inclination at the bottom face of the recess 354a; thus, the card NFC antenna 46 is brought away from the fixed NFC antenna/IC 328 in the charge/data transfer station 304, and the antenna coils do not remain parallel to each other. This prevents strong electromagnetic induction from occurring.

Example 5

Figure 15A:
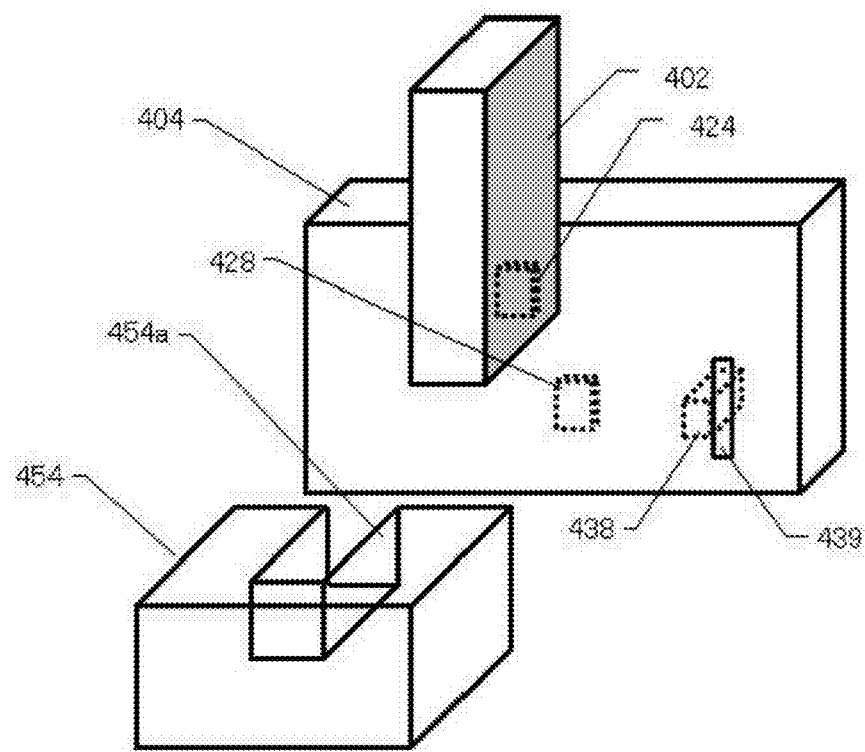
FIG. 15A is a perspective view (first state) of Example 5 embodying the present invention (Example 5)
Figure 15B:
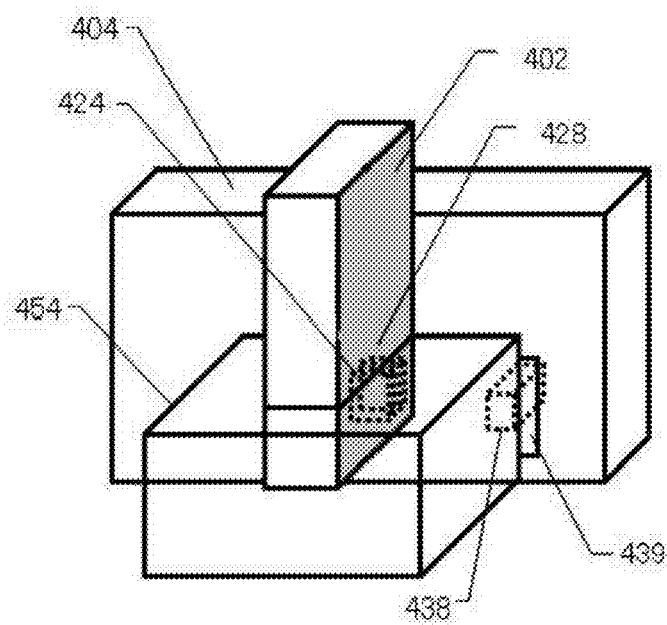
FIG. 15B is a perspective view (second state) of Example 5 embodying the present invention (Example 5)
Figure 15C:
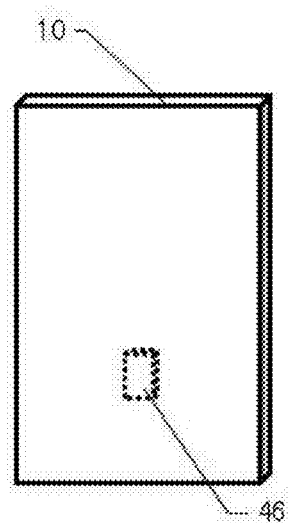
FIG. 15C is a perspective view of an IC card 10 that is likely to be inserted accidentally.

FIG. 15A to 15C are perspective views of a charge/data transfer station 404, a digital camera 402, and an adapter 454 dedicated to the digital camera 402 in a charging system of Example 5 embodying the present invention. FIG. 15A shows a state where the an adapter 454 is detached from the charge/data transfer station 404, and FIG. 15B shows a state where the adapter 454 is attached to the charge/data transfer station 404 and the digital camera 402 is inserted. FIG. 15C shows an IC card that is likely to be inserted accidentally.

As will be clear from the drawings, also in Example 5 in FIGS. 15A to 15C, as in Example 4 in FIGS. 13A and 13B, an adapter 454 with a recess 454a is used. However, whereas, in Example 4 in FIGS. 13A and 13B, the digital camera NFC antenna 324 is provided at the front face (or rear face) of the digital camera 302, in Example 5 in FIGS. 15A to 15C, a digital camera NFC antenna 424 is provided at a side face in the insertion direction of the digital camera 402. Moreover, the adapter 454 has a width smaller than the width of the charge/data transfer station 404, and accordingly a reference mark 439 is provided that serves as a reference for the position of the recess 454a. As will be clear from FIG. 15B, the adapter 454 is attached so as to align with the reference mark 439.

In other respects, Example 5 in FIGS. 15A to 15C is similar to Example 4 in FIGS. 13A and 13B. Also similarly, interchangeable adapters dedicated to different models of digital cameras are prepared, and by attaching such an adapter to the charge/data transfer station 404 such that it aligns with the reference mark 439, any digital camera can be guided such that its digital camera NFC antenna 424 or the like is always located at the position corresponding to the movable NFC antenna/IC 428. Further similarly, the adapter 454 is transparent to allow a check for the presence, inside the digital camera slot, of a foreign body that may interfere with the electromagnetic induction, and any foreign body there can easily be removed.

In Example 5 in FIGS. 15A to 15C, a digital camera NFC antenna 424 is provided at a side face in the insertion direction of the digital camera 402. Thus, even if an IC card 10 as shown in FIG. 15C is inserted in the same direction as the digital camera 402, the card NFC antenna 46 of the IC card 10 is not oriented to be parallel to the antenna coil of a movable NFC antenna/IC 428 in the charge/data transfer station 404, no strong electromagnetic induction occurs.

The various features of the present invention described above may be implemented in any other manners than in the examples specifically described above. To exploit their benefits, those features may be combined or interchanged appropriately. For example, the positioning stopper 54 in Example 1 shown in FIGS. 2A and 2B may be omitted, in which case a comparable positioning function can be achieved by mounting the digital camera 2 on the charging surface 4a such that their side faces are flush with each other by aligning an upper left corner part of the bottom face of the digital camera 2 with an upper left corner part of the charging surface 4a.

In Example 3 in FIGS. 9A and 9B, the charge/data transfer station 204 and the adapter 254 are given the same shapes at their respective front, rear, right, and left side faces, and they are positioned relative to each other by being coupled together such that their respective front, rear, right, and left side faces are flush with each other. Instead, a structure may be adopted where the adapter 254 is fitted on the charge/data transfer station 204 like a lid on a box and they are positioned relative to each other as a result of a depression provided in the bottom face of the adapter 254 being shaped identically with the top face of the charge/data transfer station 204.

Example 6

Figure 16A:
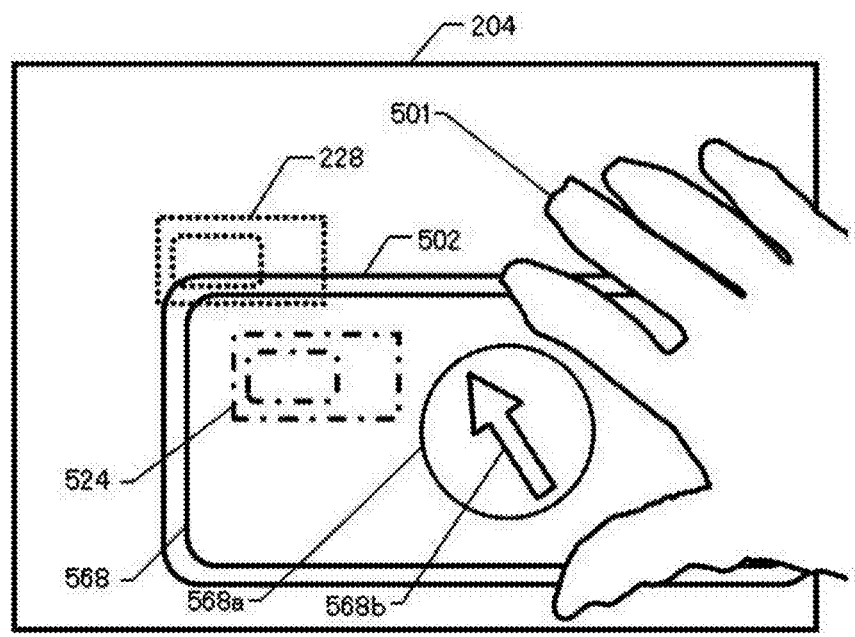
FIG. 16A is a top view (first state) of a charge/data transfer station 204 and a digital camera in Example 6 embodying the present invention (Example 6)
Figure 16B:
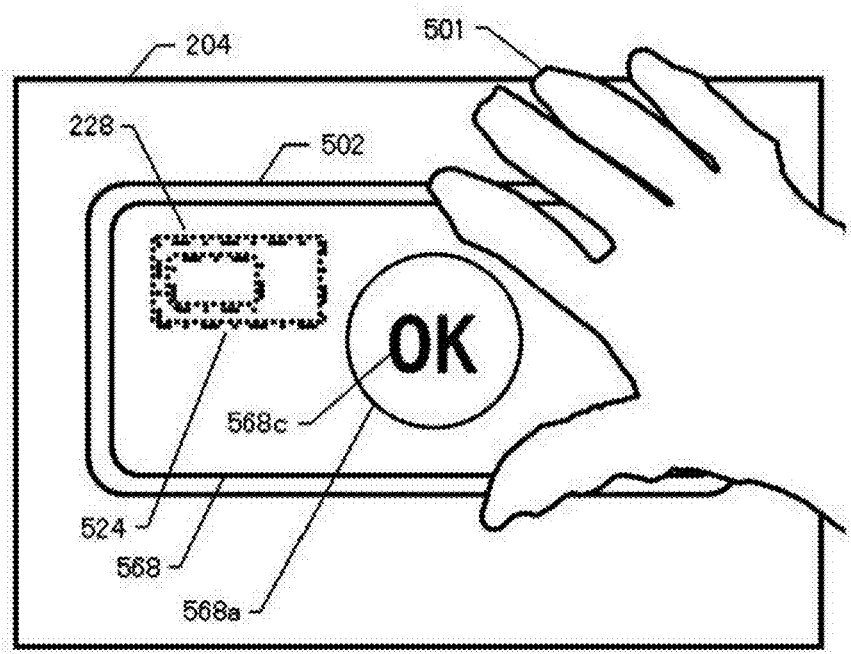
FIG. 16B is a top view (second state) of the charge/data transfer station 204 and the digital camera in Example 6 embodying the present invention (Example 6)

FIGS. 16A and 16B are top views of a charge/data transfer station 204 and a digital camera 502 in a charging system of Example 6 embodying the present invention, and show how the digital camera 502 is placed on the top face of the horizontally set charge/data transfer station 204 and is slid horizontally with a hand 501.

The charge/data transfer station 204 of Example 6, like that of Example 3 in FIG. 8, adopts a fixed NFC antenna/IC 228. However, it does not have a mechanical positioning means as in Examples 1 to 5, and instead the digital camera 502 has a charge navigation means for positioning as will be described below. FIGS. 16A and 16B illustrate charge navigation for positioning. FIG. 16A shows a state where a digital camera NFC antenna 524 in the digital camera 502 does not coincide with the fixed NFC antenna/IC 228 in the charge/data transfer station 204 and navigation display is being performed to indicate the direction in which to slide the digital camera 502 to make the two coincide. On the other hand, FIG. 16B shows a state where, as a result of the digital camera 502 being slid by the hand 501 according to the navigation display, the two now coincide.

What is shown in FIG. 16A will now be described in detail. The digital camera 502 includes a camera display 568 having color display capabilities, and in a part of the camera display 568, specifically in a central part 568a of it that is unlikely to be covered by the hand 501, a navigation arrow 568b that indicates the direction in which to slide the digital camera 502 is displayed. Not only does the navigation arrow 568b indicate the direction, its length indicates how large is the deviation from the right position; thus, the closer to the right position, the shorter the arrow becomes. As will be clear from FIG. 16A, the camera display 568 is parallel to the top face of the charge/data transfer station 204, and the digital camera 502 can be slid intuitively in the direction indicated by the navigation arrow 568b displayed.

The navigation function in Example 6 works by using the energy remaining in the rechargeable battery 20 even when the rechargeable battery 20 is recognized to be in an insufficiently charged state and the ordinary operation of the digital camera 502 is inhibited. Put reversely, insufficient charging is recognized with sufficient energy left for performing charge navigation. Moreover, to perform charge navigation while wasting as little of the above-mentioned limited remaining energy as possible, the navigation arrow 568b is displayed by using only a partial region of the camera display 568, namely the central part 568a, and driving it in monochrome. Also the backlight for the display is dimmed to minimum necessary brightness.

The direction of the navigation display is determined by trial and error by detecting the movement of the digital camera 502 and analyzing the variation, accompanying the movement, of the strength of the electromagnetic field from the charge/data transfer station 204. Also these functions are performed, with the basic clock of the digital camera 502 reduced to a minimum necessary frequency, in a charge navigation mode that consumes as little of the energy remaining in the rechargeable battery 20 as possible.

FIG. 16B shows a state where, as a result of the digital camera 502 being slid by a hand in the direction indicated by the navigation arrow 568b shown in FIG. 16A, the digital camera NFC antenna 524 in the digital camera 502 now coincides with the fixed NFC antenna/IC 228 in the charge/data transfer station 204. Also this state is achieved by trial and error by moving the digital camera 502 back and forth around the state in FIG. 16B several times and finding the position at which the strength of the electromagnetic field from the charge/data transfer station 204 is at the maximum. When the digital camera 502 is brought to the position in FIG. 16B, a display of "OK" 568c is presented in the central part 568a. Thus, the user can recognize that the digital camera 502 is positioned correctly on the charge/data transfer station 204. Then, when the digital camera 502 is stopped still at the position in FIG. 16B, the charge navigation function is stopped, and charging is started by the digital camera NFC antenna 524 and the fixed NFC antenna/IC 228.

Figure 17:
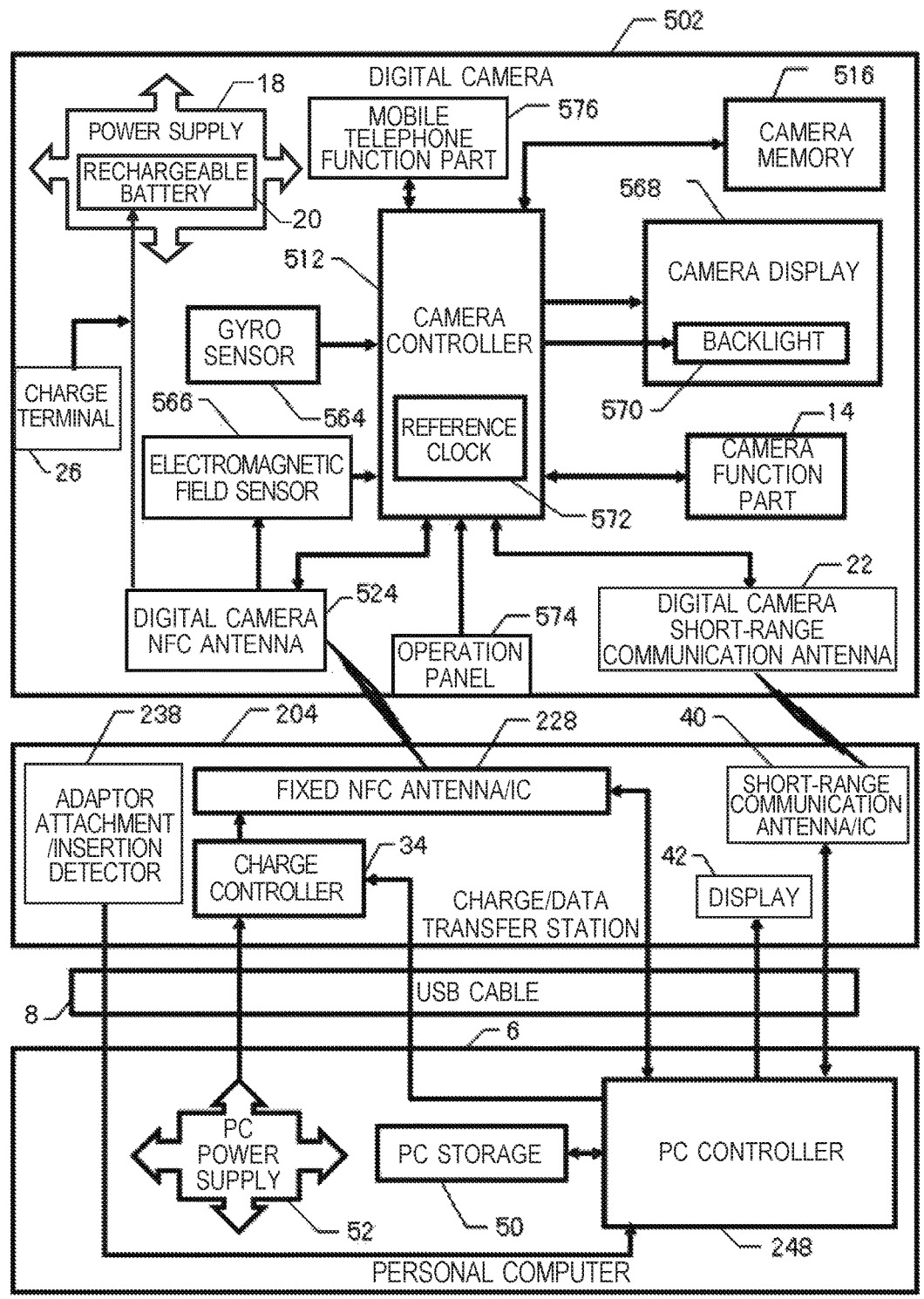
FIG. 17 is a block diagram showing the overall configuration of Example 6.

FIG. 17 is a block diagram showing the overall configuration of Example 6 in FIGS. 16A and 16B. Such parts as appear also in FIGS. 16A and 16B are identified by common reference numerals, and no overlapping description will be repeated unless necessary. Moreover, the block diagram of Example 6 has much in common with the block diagram of Example 3 in FIG. 8; accordingly, corresponding parts are identified by common reference numerals, and no overlapping description will be repeated unless necessary. The block diagram of Example 6 in FIG. 17 differs from the block diagram of Example 3 in FIG. 8 in the additional provision of blocks for, as described with reference to FIGS. 16A and 16B, positioning the digital camera 502 on the charge/data transfer station 204 for charging and data transfer by NFC antennas.

Specifically, the digital camera 502 of Example 6 in FIG. 17 includes a gyro sensor 564, an electromagnetic field sensor 566, and a camera display 568. As described above with reference to FIGS. 16A and 16B, by trial and error, while the movement of the digital camera 502 across the charge/data transfer station 204 is detected with the gyro sensor 564, the change in the strength of the electromagnetic field of the fixed NFC antenna/IC 228 is detected with the electromagnetic field sensor 566, and the direction in which to move the digital camera 502 to obtain a stronger electromagnetic field is displayed on the camera display 568 as in FIG. 16A. Moreover, when, as a result of the digital camera 502 being moved according to charge navigation, the strongest electromagnetic field is obtained, this is indicated on the camera display 568 as in FIG. 16B.

As described with reference to FIGS. 16A and 16B, the charge navigation function in Example 6 is performed by using the energy remaining in the rechargeable battery 20 in a state where, due to insufficient charging, the ordinary operation of the digital camera 502 is inhibited. Accordingly, as mentioned above, navigation display is performed by driving only a part of the camera display 568 in monochrome and with the driving duty of a backlight 570 reduced to the necessary minimum. Moreover, to suppress electric power consumption in a camera controller 512 which controls the gyro sensor 564, the electromagnetic field sensor 566, and the camera display 568 and which also performs navigation analysis, the frequency of a reference clock 572 is reduced to that for the charge navigation mode.

For automatic triggering of the charge navigation described above, various means are provided; instead, it is also possible to trigger it manually by operating an operation panel 574. In an insufficiently charged state, the ordinary operation of the digital camera 502 on the operation panel 574 is disabled altogether, but only an operation for triggering the charge navigation is enabled. The charge navigation function is performed by the camera controller 512 which executes programs stored in a camera memory 516, and the details will be given later. The digital camera 502 includes a mobile telephone function part 576, and as a whole functions as a camera-equipped mobile telephone such as a smartphone.

Figure 18:
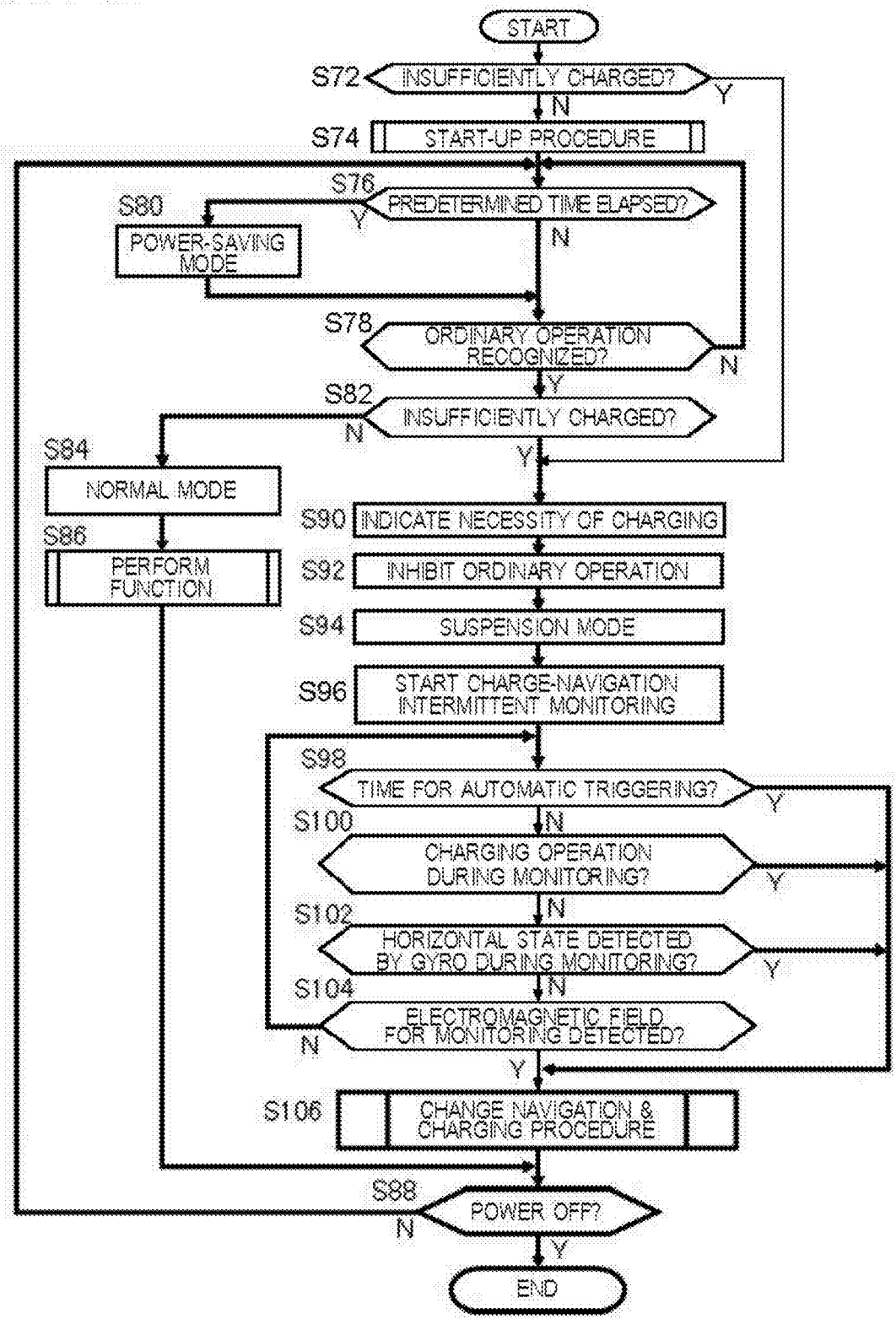
FIG. 18 is a basic flow chart illustrating the operation of a camera controller in Example 6.

FIG. 18 is a basic flow chart illustrating the operation of the camera controller 512 in Example 6 described above. The digital camera 502 performs various functions, of which only part chiefly related to the charging of the digital camera 502 placed on the charge/data transfer station 204 are extracted in the flow in FIG. 18. Thus, the flow actually gone through by the digital camera 502 achieves various other function that are not illustrated. The flow in FIG. 18 starts when the power to the digital camera 502 is turned on by operation on the operation panel 574. First, at step S72, it is checked whether or not the digital camera 502 is in an insufficiently charged state.

If it is not in an insufficiently charged state, then, at step S74, a start-up procedure for the digital camera 502 is performed, the flow then proceeds to step S76. At step S76, it is checked whether or not a predetermined time has elapsed since the previous operation (in this case, the turning-on of the power), and if the predetermined time has not elapsed, then, at step S78, it is checked whether or not an ordinary operation is being performed. If no operation is recognized, the flow returns to step S76. On the other hand, if, at step S76, the predetermined time is recognized to have elapsed, then, at step S80, the frequency of the reference clock 572 is reduced so that a power-saving mode is in effect, and the flow then proceeds to step S78. The frequency of the reference clock 572 in the above-mentioned charge navigation mode is still lower than its frequency in this power-saving mode. Thereafter, until an ordinary operation is realized at step S78, the steps S76 through S80 are repeated in the normal mode or in the power-saving mode. When step S80 is reached already in the power-saving mode, nothing is performed.

When, at step S78, an ordinary operation is recognized, then, at step S82, it is checked whether or not, at this point, the digital camera 502 is in an insufficiently charged state. If it is not in an insufficiently charged state, then, at step S84, the frequency of the reference clock 572 is increased so that the normal mode is in effect. If the normal mode is already in effect, nothing is performed at step S84. Then, at step S86, the function based on the operation is performed, and when the function is completed, the flow proceeds to step S88. At step S88, it is checked whether or not an operation for turning off the power is performed. If the power is turned off, the flow returns to step S76. Thereafter, unless an insufficiently charged state is recognized at step S82 or the power is recognized to have been turned off at step S88, steps S76 through S88 are repeated, so that ordinary functions of the digital camera 502 are performed.

On the other hand, if, at step S82, insufficient charging is recognized, then the flow proceeds to step S90. If insufficient charging is recognized at the stage of step S72, the flow proceeds immediately to step S90 without performing the start-up procedure. At step S90, an indication to the effect that charging is necessary is displayed, and then, at step S92, any ordinary operation is disabled, the flow then proceeding to a suspended mode at step S94. The suspended mode is a state where the digital camera 502 basically does not operate but where minimum operations necessary to trigger the start of charging are maintained.

Specifically, at step S96, intermittent monitoring for charge navigation is started. The intermittent monitoring is a function for monitoring at predetermined time intervals during suspension whether or not charge navigation has been triggered. Except at times at which the intermittent monitoring is performed, the digital camera 502 suspends operation, and unless a trigger is recognized during the intermittent monitoring, the digital camera 502 suspends operation until the subsequent time for the intermittent monitoring. At step S98, it is checked whether or not a time for automatic triggering has arrived. A time for automatic triggering is for sequentially counting intermittent monitoring instances that ended without recognizing a trigger to automatically issue a trigger when the count value reaches a predetermined number of times, and this serves to complement accidental failure of the triggers that will be described later.

If an automatic triggering time has not arrived, the flow proceeds to step S100, where it is checked whether or not, during intermittent monitoring, a manual charging operation on the operation panel 574 has been recognized. If no charging operation has been recognized, than, at step S102, it is checked whether or not the digital camera 502 is in a horizontal state (possibility of placement on the charge/data transfer station 204) based on detection of a gravity acceleration by the gyro sensor 564 during intermittent monitoring. If a horizontal state is not detected, then, at step S104, it is checked whether or not an electromagnetic field has been detected by the electromagnetic field sensor 566 during intermittent monitoring (possibility of placement on the charge/data transfer station 204). If no electromagnetic field has been detected, the flow returns to step S98, and thereafter, unless the cause for a trigger is recognized during intermittent monitoring, steps S98 through S104 are repeated.

On the other hand, if, at any of steps S98 through S104, a cause of triggering is recognized, the flow proceeds immediately to step S106, where a procedure for charge navigation and charging is started. This procedure will be described in detail later. When the procedure for charge navigation and charging is complete, the flow proceeds to step S88. If, at step S88, the power is not recognized to be off, the flow proceeds, as in the normal mode, to S76. In this way, unless the power is recognized to be off at step S88, the basic flow comprising steps S72 through S106 is repeated. On the other hand, if, at step S88, the power is recognized to be off, the flow ends.

Figure 19:
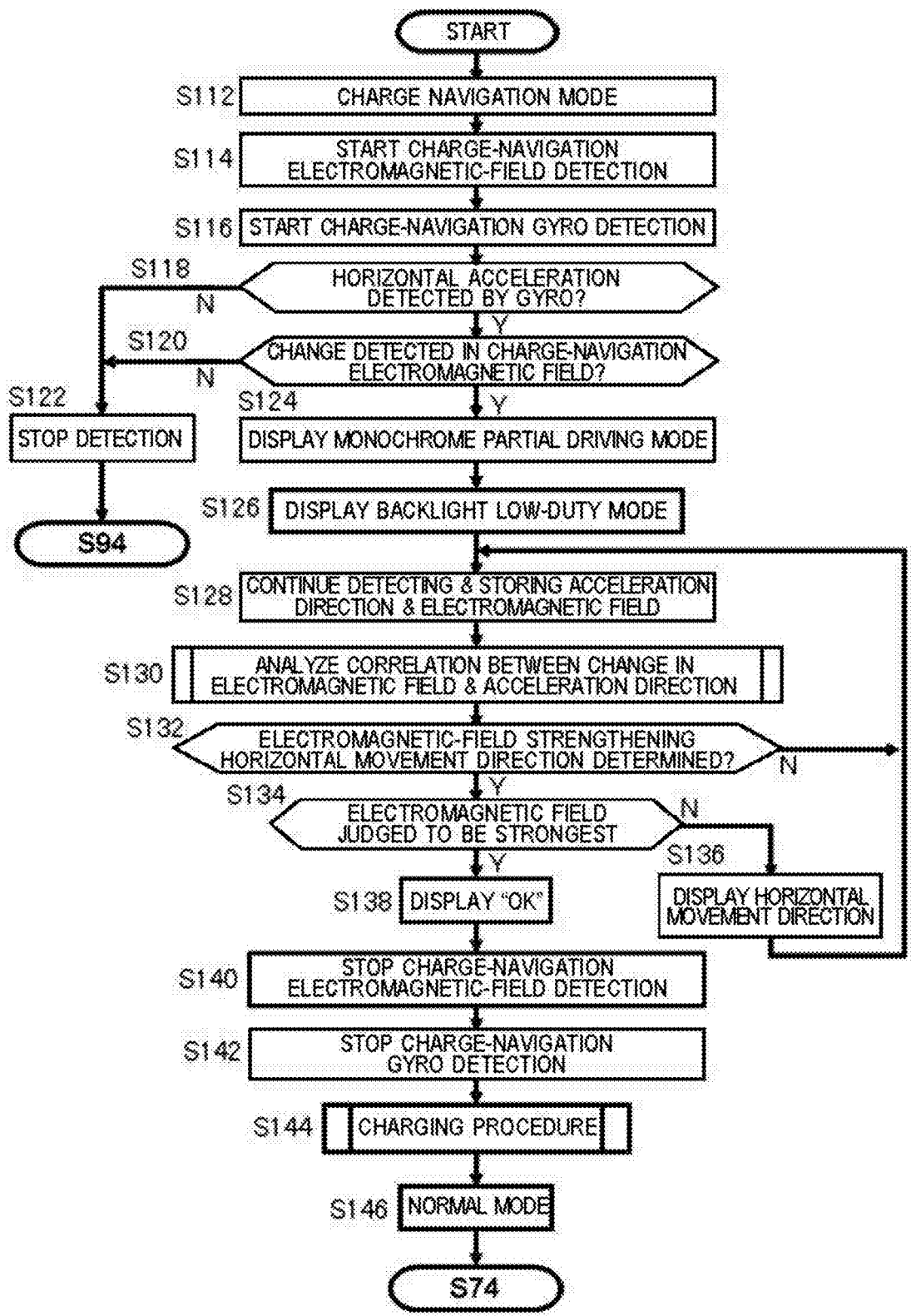
FIG. 19 is a flow chart showing the details of step S106 in FIG. 18.

FIG. 19 is a flow chart showing the details of the procedure for charge navigation and charging at step S106 in FIG. 18. When the flow starts, at step S112, a charge navigation mode is put into effect. As mentioned above, the frequency of the reference clock 572 in the charge navigation mode is still lower than the frequency in the power-saving mode, and is set at the minimum electric power consumption necessary to achieve the procedure and speed required for charge navigation. Next, at step S114, charge-navigation electromagnetic-field detection by the electromagnetic field sensor 566 is started. This electromagnetic-field detection function is more sophisticated than the simple detection for the presence or absence of an electromagnetic field at step S104. Next, at step S116, charge-navigation gyro detection by the gyro sensor 564 is started. This gyro detection function is a version of the horizontal direction movement detection (two-dimensional detection) by the digital camera 502 performed with simplified conditions to achieve higher analysis efficiency.

Next, at step S118, it is checked whether or not a horizontal acceleration is detected by the gyro sensor 564. If a horizontal acceleration is detected, then, at step S120, it is checked whether or not a change in the electromagnetic field that accompanies horizontal movement is detected by the electromagnetic field sensor 566. If, at step S118, no horizontal acceleration is detected (for example, when the digital camera 502 is simply slid on a desk), the flow proceeds to step S122, where the charge-navigation electromagnetic-field detection and the charge-navigation gyro detection are stopped, and the flow then proceeds to step S94 in FIG. 18. In this case, at step S94, the suspension mode is put back into effect, and whether or not a triggering condition is fulfilled again is monitored by intermittent monitoring.

On the other hand, if, at step S120, a change in the electromagnetic field that accompanies horizontal movement of the digital camera 502 is detected, it is judged that operation for positioning for charging is being performed by the user, and the flow proceeds to step S124. Then, at step S124, the camera display 568 is set to a partial monochrome drive mode to evoke a low-power-consumption display state. Moreover, at step S126, the lighting duty of a backlight 570 is reduced to evoke a low-power-consumption display illustration state.

Next, at step S128, the outputs of the gyro sensor 564 and the electromagnetic field sensor 566 continue to be monitored at an operation speed based on the clock frequency in the charge navigation mode to be stored and accumulated. Then, at step S130, from a history of changes in the stored and accumulated information, the correlation between the change of the electromagnetic field and the direction of the acceleration is analyzed. Based on the results of this analysis, at step S132, it is checked whether or not a horizontal movement direction in which the electromagnetic field becomes stronger has been determined. If an analysis for determining the direction to move is possible, then the flow proceeds to step S134, where, by the well-known mountain-climbing method, it is checked whether or not the current electromagnetic field is the strongest.

If, at step S134, the electromagnetic field cannot be judged to be the strongest, the flow proceeds to S136, where the horizontal movement direction, determined at step S132, in which the electromagnetic field becomes stronger is displayed on the camera display 568, and the flow then returns to step S128. On the other hand, also if, at step S132, the digital camera 502 is not moved sufficiently to determine the movement direction and the stored and accumulated information is insufficient, the flow returns to step S128, where accumulation of information is continued by trial and error. In this way, unless the electromagnetic field is judged to be the strongest at step S134, the digital camera 502 continues to be slid by trial and error while referring to the display at the step S136. This state corresponds to FIG. 16A.

On the other hand, if, at step S134, the electromagnetic field is judged to be the strongest, the flow proceeds to step S138, where an "OK" display indicating successful positioning is presented. This state corresponds to FIG. 16B. Then, at step S140, detection of the electromagnetic field is stopped and, at step S142, the horizontal movement detection by the gyro sensor 564 is stopped, the flow then proceeding to the charging procedure at step S144. When the charging is complete or interrupted, the flow proceeds via step S146 to step S74 in FIG. 18. Thus, unless charging is insufficient at step S82, the digital camera 502 returns to normal operation; if, as a result of charging being interrupted, charging is judged to be insufficient at step S82, the charging flow starting at step S90 can be resumed.

The various features of the present invention described above may be implemented in any other manners than in the examples specifically described above. To exploit their benefits, those features may be combined or interchanged appropriately. For example, although the examples deal with digital cameras, implementation is also possible in the form of a camera-equipped mobile telephone such as a smartphone or the like as in Example 6 in FIGS. 16 to 19. The information source for the display of positioning in the charge navigation function provided in Example 6 is not limited to one provided within the digital camera 502 as in Example 6; instead, a sensor for positioning may be provided in the charge/data transfer station 204, a judgement may be made on the charge/data transfer station 204, and only the resulting guide information may be delivered from the charge/data transfer station 204 to the digital camera 502 for display. Also in this case, the feature of power-saving guidance display in the digital camera 502 can be utilized.

In Example 6 in FIGS. 16 to 19, a configuration is adopted where visual display is presented to guide positioning. However, the guiding means is not limited to visual one; guiding may instead be provided audibly. Guiding with sound can be direction guiding with speech language, guiding in which a buzzer is sounded increasingly loud as the electromagnetic field becomes stronger, or sounding a buzzer with increasingly short intermittence as the electromagnetic field becomes stronger, a configuration is thus possible that audibly conveys the information represented by the length of the arrow in FIG. 16A. Guiding is also possible in which vibration is conducted to the hand 501 that slides the digital camera 502, and the vibration is intensified as the electromagnetic field becomes stronger. More than one of such visual, audible, and tactile guiding arrangements can be combined as necessary. In a case where a configuration is adopted where only the strength of the electromagnetic field is fed back by guiding and, for the direction, learning through trial and error by the user himself is relied on, the detection of the movement direction of the digital camera 502 may be omitted.

The configurations of Example 6 in FIGS. 16 to 19 and of the modified examples mentioned above can be applied not only to positioning for charging but, as necessary, also for positioning performed for more efficient communication by NFC.

<Synopsis>

To follow is a synopsis of the various examples described thus far.

According to one example disclosed herein, a charging system includes: a mobile device including a first NFC antenna and a rechargeable battery which is charged based on a current induced in the first NFC antenna by electromagnetic induction; and a charger including a second NFC antenna which causes electromagnetic induction in the first NFC antenna and a supplier which supplies the second NFC antenna with a feed current for electromagnetic induction; and a protector which prevents improper electromagnetic induction between the first and second NFC antennas. Thus, it is possible to prevent an IC card from being broken accidentally by electromagnetic induction by the charger.

According to a specific feature, the protector includes an inhibitor which inhibits the supplier from supplying the feed current. According to more specific feature, the inhibitor lets the supplier supply the feed current unless the mobile device in a predetermined state is confirmed to be in proximity to the charger. According to another more specific feature, the charging system includes a sensor which confirms the mobile device in a predetermined condition to be in proximity to the charger.

According to another specific feature, the charging system includes a guide which guides such that the mobile device in a predetermined state is in proximity to the charger. According to a more specific feature, the guide prevents a device not expected to be charged from being in proximity to the second NFC antenna. According to another more specific feature, the guide is detachably attached to the charger, and the charging system includes an inhibitor which inhibits the supplier from supplying the feed current when the guide is detached from the charger.

According to another specific feature, the charging system includes an actuator which moves the second NFC antenna to a position corresponding to the first NFC antenna.

According to a more specific feature, the charging system includes an inhibitor which inhibits the second NFC antenna from moving when improper electromagnetic induction is recognized to be about to occur.

According to another feature of the example disclosed herein, a charger includes: a power feeding-compatible NFC antenna which causes electromagnetic induction in an NFC antenna in a mobile device; a charger including a supplier which supplies a feed current for electromagnetic induction to the power feeding-compatible NFC antenna; and a protector which prevents improper electromagnetic induction by the power feeding-compatible NFC antenna.

According to another feature of the example disclosed herein, a mobile device includes: a communication NFC antenna; and a rechargeable battery which shares the communication NFC antenna to be charged based on a current induced in the communication NFC antenna by electromagnetic induction, wherein the mobile device is combined with a guide dedicated to it which guides the communication NFC antenna to the charger for electromagnetic induction. According to a specific feature, the guide is transparent for easy finding of a foreign body that obstructs electromagnetic induction. According to another specific feature, the guide includes a foreign-body sweeper.

According to the example disclosed herein, a mobile device includes: a communication NFC antenna; a rechargeable battery which shares the communication NFC antenna to be charged based on a current induced in the communication NFC antenna by electromagnetic induction; and a guide display part which guides the communication NFC antenna to the charger for electromagnetic induction. Thus, it is possible to perform charging properly.

According to a specific feature, the guide display part displays a movement direction in which to move the mobile device across the top face of the charger. According to a more specific feature, the guide display part has a display surface that is parallel to the top face of the charger. According to another specific feature, the mobile device makes the guide display part display whether or not it is in a properly positioned state.

According to another specific feature, the mobile device includes a display which displays a mobile device function, and the guide display part is the display and, when performing guidance display, does so in a power-saving manner. Thus, it is possible to perform guidance display effectively in an insufficiently charged state. According to a more specific feature, the guide display part performs guidance display by using only a partial region of the display surface of the display. According to a more specific feature, the display has a color display function, and the guide display part performs guidance display by using the display in monochrome. According to a more specific feature, the display includes a backlight, and the guide display part performs guidance display by using the backlight in a power-saving manner. According to a more specific feature, the display, when the guide display part performs guidance display, reduces the basic clock frequency of the mobile device.

According to another specific feature, an insufficient charge is judged with sufficient electric power left for guiding by the guide display part, and in an insufficiently charged state, any operation other than guiding by the display is inhibited. It is possible to perform guidance display in an insufficiently charged state.

According to another specific feature, the guide display part guides a user as to a direction for positioning based on a change in the strength of an electromagnetic field resulting from the user moving the mobile device. According to a more specific feature, the guide display part analyzes the relationship between how the movement of the mobile device across the top face of the charger is sensed and how the strength of the electromagnetic field is sensed, and guides such that the mobile device is moved in the direction in which the electromagnetic field becomes stronger.

According to another specific feature, in a suspension state due to an insufficient charge, the guide display part can be operated. According to a more specific feature, the mobile device monitors intermittently whether or not to operate the guide display part to operate the guide display part. According to another specific feature, the mobile device operates the guide display part automatically at predetermined time intervals. According to another more specific feature, the mobile device operates the guide display part when the mobile device is in a horizontal state. According to another more specific feature, the mobile device operates the guide display part when an electromagnetic field is recognized to be present.

INDUSTRIAL APPLICABILITY

The present invention finds applications in charging systems using NFC, mobile devices chargeable by NFC, and chargers.

LIST OF REFERENCE SIGNS 24, 60, 260, 224, 324, 424 first NFC antenna
2, 58, 202, 258, 302, 402 mobile device
28, 228, 328, 428 second NFC antenna
4, 104, 204, 304, 404 charger
38, 48, 148, 254, 255, 354, 454 protector
524 communication NFC antenna
20 rechargeable battery
568 guide display part
568a partial region of a display surface of a display
570 backlight
572 reference clock
566 electromagnetic field sensor
564 gyro sensor

The invention claimed is:
1. A charging system comprising:
a mobile device including:
   a first NFC antenna for near-field data communication and for being caused electromagnetic induction; and
   a rechargeable battery which is charged based on a current induced in the first NFC antenna by the electromagnetic induction; and
a charger including:
   a second NFC antenna which causes electromagnetic induction in the first NFC antenna; and
   a supplier which supplies the second NFC antenna with a current for the electromagnetic induction,
wherein the charging system is provided with a controller which causes electromagnetic induction between the first and second NFC antennas, and
wherein the controller is configured to prevent another device from being broken accidentally by the electromagnetic induction caused by the second NFC antenna, the other device having an NFC antenna which is not prepared to cause the electromagnetic induction by the second NFC antenna, but is limited for use in near-field data communication.

2. The charging system according to claim 1, wherein
the controller is a protector which inhibits the supplier from supplying the current for causing the electromagnetic induction unless the mobile device in a predetermined state is confirmed to be in proximity to the charger.

3. The charging system according to claim 1, wherein the controller is a guide which guides such that the mobile device in a predetermined state is in proximity to the charger.

4. The charging system according to claim 3, wherein the guide prevents the other device from being in proximity to the second NFC antenna.

5. The charging system according to claim 3, wherein the guide includes a guide display part which guides as to a direction in which the mobile device in the predetermined state is in proximity to the charger.

6. The charging system according to claim 1, further comprising:
an actuator which moves the second NFC antenna to a position corresponding to the first NFC antenna,
wherein the controller is a protector which inhibits the second NFC antenna from moving when improper electromagnetic induction is recognized to be about to occur.

7. A charger comprising:
a power feeding-compatible NFC antenna which causes electromagnetic induction in an NFC antenna in a mobile device;
a charger including a supplier which supplies a current for causing the electromagnetic induction to the power feeding-compatible NFC antenna; and
a protector which prevents improper electromagnetic induction by the power feeding-compatible NFC antenna, wherein the protector is configured to prevent another device from being broken accidentally by the electromagnetic induction caused by the feeding-compatible NFC antenna, the other device having an NFC antenna which is not prepared to cause the electromagnetic induction by the feeding-compatible NFC antenna, but is limited for use in near-field data communication.

8. A mobile device comprising:
a communication NFC antenna for near-field data communication and for being caused electromagnetic induction;
a rechargeable battery which shares the communication NFC antenna to be charged based on a current induced in the communication NFC antenna by electromagnetic induction; and
a guide which guides the communication NFC antenna to a charger for electromagnetic induction, wherein the guide is so configured that another device is prevented from being guided to the charger for the electromagnetic induction, otherwise the other device is to be broken accidentally by the electromagnetic induction, the other device having an NFC antenna which is not prepared to cause the electromagnetic induction, but is limited for use in near-field data communication.

9. The mobile device according to claim 8, wherein the guide is an accessory dedicated to but separate from the mobile device, and guides, when combined with the mobile device, the communication NFC antenna to the charger.

10. The mobile device according to claim 8, wherein the guide is a guide display part.

11. The mobile device according to claim 10, wherein the guide display part displays a movement direction in which to move the mobile device across a top face of the charger.

12. A mobile device comprising:
a communication NFC antenna;
a rechargeable battery which shares the communication NFC antenna to be charged based on a current induced in the communication NFC antenna by electromagnetic induction;
a guide which guides the communication NFC antenna to a charger for electromagnetic induction; and
a display which displays a mobile device function,
wherein the guide is a guide display part,
and wherein
the guide display part performs guidance display by using the display, and, when performing guidance display, performs guidance display in a power-saving manner by one or a combination of methods including:
using only a partial region of a display surface of the display;
if the display has a color display function, using the display in monochrome;
if the display has a backlight, using the backlight in a power-saving manner; and
reducing a reference clock frequency of the mobile device.

13. The mobile device according to claim 12, wherein
an insufficient charge is judged with sufficient electric power left for guiding by the guide display part, and
in an insufficiently charged state, any operation other than guiding by the guide display part is inhibited.

14. The mobile device according to claim 12, wherein the guide display part guides a user as to a direction for positioning based on a change in strength of an electromagnetic field resulting from the user moving the mobile device.

15. The mobile device according to claim 12, wherein in a suspension state due to an insufficient charge, the guide display part can be operated.

16. The mobile device according to claim 15, wherein whether or not to operate the guide display part is monitored intermittently to operate the guide display part.

17. The mobile device according to claim 15, wherein the guide display part is operated automatically at predetermined time intervals.

18. The mobile device according to claim 12, wherein when the mobile device is in a horizontal state, the guide display part is operated.

19. The mobile device according to claim 12, wherein when an electromagnetic field is recognized to be present, the guide display part is operated.

20. The mobile device according to claim 12, wherein the guide display part displays whether or not the communication NFC antenna is positioned properly relative to the charger.

* * * * *